(12) United States Patent
Konishi et al.

(10) Patent No.: US 11,989,950 B2
(45) Date of Patent: May 21, 2024

(54) INFORMATION PROCESSING APPARATUS, VEHICLE SYSTEM, INFORMATION PROCESSING METHOD, AND STORAGE MEDIUM

(71) Applicant: HONDA MOTOR CO., LTD., Tokyo (JP)

(72) Inventors: Tatsuya Konishi, Wako (JP); Katsunori Miyazawa, Wako (JP); Kenta Ishii, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 176 days.

(21) Appl. No.: 17/024,834

(22) Filed: Sep. 18, 2020

(65) Prior Publication Data

US 2021/0086787 A1 Mar. 25, 2021

(30) Foreign Application Priority Data

Sep. 24, 2019 (JP) ................................. 2019-173242

(51) Int. Cl.
*G06V 20/58* (2022.01)
*B60W 60/00* (2020.01)
(Continued)

(52) U.S. Cl.
CPC ......... *G06V 20/584* (2022.01); *B60W 60/001* (2020.02); *G06V 10/811* (2022.01);
(Continued)

(58) Field of Classification Search
CPC ......... B60W 60/00272; B60W 60/001; B60W 2420/42; B60W 2420/52; B60W 2420/40;
(Continued)

(56) References Cited

U.S. PATENT DOCUMENTS 9,563,809 B2 * 2/2017 Salomonsson ......... B60Q 9/008
9,744,915 B2 * 8/2017 Gokan ................ B60W 30/095
(Continued)

FOREIGN PATENT DOCUMENTS

CN        1658107        8/2005
CN     203211328        9/2013
(Continued)

OTHER PUBLICATIONS

Japanese Office Action for Japanese Patent Application No. 2019-173242 dated Jun. 8, 2021.
(Continued)

*Primary Examiner* — Russell Frejd
*Assistant Examiner* — Brandon Z Willis
(74) *Attorney, Agent, or Firm* — Amin, Turocy & Watson, LLP

(57) ABSTRACT

An information processing apparatus includes a first detection unit which detects an object around a vehicle, a second detection unit of which at least a part of a detection range overlaps a detection range of the first detection unit and which detects an object around the vehicle, and a determination unit which determines whether or not the object has started to move on the basis of detection results of the first detection unit and the second detection unit. The determination unit determines that the object has started to move in a case in which the vehicle and the object are in a halted state when a detection result of the first detection unit indicates that the object has started to move and a detection result of the second detection unit indicates that the object has started to move.

11 Claims, 15 Drawing Sheets

(51) Int. Cl.
  *G06V 10/80* (2022.01)
  *G06V 40/12* (2022.01)

(52) U.S. Cl.
  CPC ... *G06V 40/1365* (2022.01); *B60W 2420/403* (2013.01); *B60W 2420/408* (2024.01); *B60W 2554/4041* (2020.02); *B60W 2554/4042* (2020.02); *B60W 2554/4045* (2020.02)

(58) Field of Classification Search
  CPC ....... B60W 2420/403; B60W 2422/95; B60W 2520/04; B60W 2520/10; B60W 2554/20; B60W 2554/4041; B60W 2554/4042; B60W 2554/4044; B60W 2554/4045; B60W 2554/4046; B60W 2554/802; B60W 2554/804; G06V 20/56; G06V 20/58; G06V 20/584; G06V 2201/08; G06V 40/1365
  See application file for complete search history.

(56) References Cited

U.S. PATENT DOCUMENTS

| | | | | |
|---|---|---|---|---|
| 10,059,340 | B2* | 8/2018 | Sugano | B60W 30/17 |
| 10,118,617 | B2* | 11/2018 | Urano | B60W 30/17 |
| 10,882,536 | B2* | 1/2021 | Lee | B60W 50/14 |
| 11,066,072 | B2* | 7/2021 | Kim | B60W 40/04 |
| 11,150,649 | B2* | 10/2021 | Sato | B60W 50/14 |
| 11,167,756 | B2* | 11/2021 | Shalev-Shwartz | B60W 60/00274 |
| 2005/0187697 | A1 | 8/2005 | Arai et al. | |
| 2018/0267170 | A1 | 9/2018 | Kuroda | |
| 2018/0335774 | A1 | 11/2018 | Sato et al. | |
| 2019/0047552 | A1 | 2/2019 | Hattori | |
| 2019/0283746 | A1 | 9/2019 | Shalev-Shwartz et al. | |

FOREIGN PATENT DOCUMENTS

| | | |
|---|---|---|
| CN | 108627844 | 10/2018 |
| JP | 2001-099930 | 4/2001 |
| JP | 2003-202377 | 7/2003 |
| JP | 2005-247143 | 9/2005 |
| JP | 2011-117895 | 6/2011 |

OTHER PUBLICATIONS

Chinese Office Action for Chinese Patent Application No. 202010991885.1 dated May 16, 2023.
Chinese Office Action for Chinese Patent Application No. 202010991885.1 mailed Feb. 29, 2024.

* cited by examiner

FIG. 7

| CONDITION 1 | CURRENT SPEED OF TARGET OBJECT IS EQUAL TO OR HIGHER THAN THRESHOLD A |
|---|---|
| CONDITION 2 | TWO OR MORE CONDITIONS OF FOLLOWING CONDITIONS (a) TO (c) ARE SATISFIED<br>CONDITION (a): CURRENT SPEED OF TARGET OBJECT IS EQUAL TO OR HIGHER THAN THRESHOLD a<br>CONDITION (b): CURRENT SPEED OF TARGET OBJECT-SPEED BEFORE PREDETERMINED TIME IS EQUAL TO OR HIGHER THAN THRESHOLD b<br>CONDITION (c): CURRENT POSITION OF TARGET OBJECT- POSITION BEFORE PREDETERMINED TIME IS EQUAL TO OR HIGHER THAN THRESHOLD c |
| CONDITION 3 | TARGET OBJECT IS MOVING IN DIRECTION IN WHICH TARGET OBJECT IS AWAY FROM HOST VEHICLE |

| | CAMERA | RADAR DEVICE | FINDER |
|---|---|---|---|
| CONDITION 1 | O | – | O |
| CONDITION 2 | – | O | – |
| CONDITION 3 | O | O | O |
| INTEGRATED DETERMINATION RESULT | O (STARTING) | O (STARTING) | O (STARTING) |

INFORMATION PROCESSING APPARATUS, VEHICLE SYSTEM, INFORMATION PROCESSING METHOD, AND STORAGE MEDIUM

CROSS-REFERENCE TO RELATED APPLICATION

Priority is claimed on Japanese Patent Application No. 2019-173242, filed Sep. 24, 2019, the entire content of which is incorporated herein by reference.

BACKGROUND OF THE INVENTION

Field of the Invention

The present invention relates to an information processing apparatus, a vehicle system, an information processing method, and a storage medium.

Description of Related Art

In the related art, regarding surroundings monitoring sensors equipped with a millimeter wave radar, an image sensor, and a signal processing unit, a surroundings monitoring sensor in which a signal processing unit makes information related to an object that is an object present within a predetermined area by composing information acquired from the millimeter wave radar and information acquired from the image sensor is disclosed (for example, refer to Japanese Unexamined Patent Application, First Publication No. 2001-99930).

SUMMARY OF THE INVENTION

However, in a technology in the related art, there are cases in which it may be assumed that an object has started to move even when the object has not started to move.

Aspects of the present invention have been made in consideration of such circumstances, and an objective thereof is to provide an information processing apparatus, which is capable of more accurately recognizing that an object has started to move, a vehicle system, an information processing method, and a storage medium.

In order to resolve the foregoing problem and achieve the objective, the present invention employs the following aspects.

(1): According to an aspect of the present invention, there is provided an information processing apparatus including a first detection unit which detects an object around a vehicle, a second detection unit of which at least a part of a detection range overlaps a detection range of the first detection unit and which detects an object around the vehicle, and a determination unit which determines whether or not the object has started to move on the basis of detection results of the first detection unit and the second detection unit. The determination unit determines that the object has started to move in a case in which the vehicle and the object are in a halted state when a detection result of the first detection unit indicates that the object has started to move and a detection result of the second detection unit indicates that the object has started to move.

(2): According to the aspect of (1) described above, the determination unit may determine that the object has started to move in a case in which the vehicle and the object are in a halted state and the object is present within a predetermined range in front of the vehicle when a detection result of the first detection unit indicates that the object has started to move and a detection result of the second detection unit indicates that the object has started to move.

(3): According to the aspect of (1) or (2) described above, the determination unit may start the determination when an object detected by the first detection unit at a different timing is identified and an object detected by the second detection unit at a different timing is identified before the determination is started.

(4): According to any one of the aspects of (1) to (3) described above, the determination unit may determine that the object has started to move when it is determined that a state of the object satisfies at least two or more conditions of a condition a, a condition b, and a condition c related to a speed or a position on the basis of a detection result of the first detection unit and it is determined that a state of the object satisfies at least two or more conditions of the condition a, the condition b, and the condition c related to the speed or the position on the basis of a detection result of the second detection unit. The condition a may be that a current speed of the object is equal to or higher than a first threshold. The condition b may be that a current speed of the object is higher than a speed of the object a predetermined time before a current time by a second threshold or larger. The condition c may be that a current position of the object is away from a position of the object a predetermined time before by a third threshold or larger.

(5): According to any one of the aspects of (1) to (4) described above, the determination unit may determine that the object has moved when it is determined that a state of the vehicle satisfies a first condition on the basis of a detection result of the first detection unit and it is determined that a state of the vehicle satisfies the first condition on the basis of a detection result of the second detection unit. The first condition may be that one or both of that a current speed of the object is equal to or higher than a fourth threshold and that a state of the object satisfies at least two or more conditions of a condition a, a condition b, and a condition c are satisfied. The condition a may be that a current speed of the object is equal to or higher than a first threshold. The condition b may be that a current speed of the object is higher than a speed of the object a predetermined time before a current time by a second threshold or larger. The condition c may be that a current position of the object is away from a position of the object a predetermined time before by a third threshold or larger.

(6): According to any one of the aspects of (1) to (3) described above, the determination unit may determine that the object has moved when it is determined that a state of the vehicle satisfies a first condition on the basis of a detection result of the first detection unit and it is determined that a state of the vehicle satisfies the first condition on the basis of a detection result of the second detection unit. The first condition may be that one or both of that a current speed of the object is equal to or higher than a fourth threshold and that a state of the object satisfies at least two or more conditions of a condition a, a condition b, and a condition c are satisfied, and that the object is moving in a direction in which the object is being away from the vehicle. The condition a may be that a current speed of the object is equal to or higher than a first threshold. The condition b may be that a current speed of the object is higher than a speed of the object a predetermined time before a current time by a second threshold or larger. The condition c may be that a current position of the object is away from a position of the object a predetermined time before by a third threshold or larger.

(7): According to the aspect of (5) or (6) described above, the information processing apparatus may further include a third detection unit of which at least a part of a detection range overlaps the detection ranges of the first detection unit and the second detection unit and which detects an object around the vehicle; and a fourth detection unit of which at least a part of a detection range overlaps the detection ranges of the first detection unit, the second detection unit, and the third detection unit and which detects an object around the vehicle. The determination unit may confirm that the object has not moved when it is determined that a state of the vehicle does not satisfy the first condition on the basis of a detection result of the third detection unit and it is determined that a state of the vehicle does not satisfy the first condition on the basis of a detection result of the fourth detection unit.

(8): According to any one of the aspects of (1) to (7) described above, the information processing apparatus may further include a third detection unit of which at least a part of a detection range overlaps the detection ranges of the first detection unit and the second detection unit and which detects an object around the vehicle; and a fourth detection unit of which at least a part of a detection range overlaps the detection ranges of the first detection unit, the second detection unit, and the third detection unit and which detects an object around the vehicle. The determination unit may determine that the object has not started to move in a case in which the vehicle and the object are in a halted state when a detection result of the third detection unit indicates that the object has not started to move and a detection result of the fourth detection unit indicates that the object has not started to move.

(9): According to any one of the aspects of (1) to (8) described above, each of the first detection unit and the second detection unit may be any one of a camera capturing an image of scenery around the vehicle, a radar device radiating electric waves around the vehicle and detecting the object on the basis of electric waves which are reflected waves of the radiated electric waves from the object, and an optical apparatus emitting light around the vehicle and detecting the object on the basis of light which is reflected light of the emitted light from the object.

(10): According to any one of the aspects of (1) to (9) described above, the first detection unit may be a detection unit of a first classification. The second detection unit may be a detection unit having a functional configuration different from a functional configuration of the first classification.

(11): According to another aspect of the present invention, there is provided an information processing apparatus including a plurality of detection units of which at least parts of detection ranges overlap each other and which detect an object around a vehicle, and a determination unit which determines whether or not the object has started to move on the basis of detection results of the plurality of detection units. The determination unit determines whether or not the object has started to move for each detection result of each of the detection units included in the plurality of detection units when the vehicle and the object are in a halted state and determines that the object has started to move when the number of affirmative determination results is equal to or higher than a threshold in the determination results.

(12): According to another aspect of the present invention, there is provided a vehicle system including the information processing apparatus according to any one of the aspects (1) to (11) described above, and a vehicle control apparatus which controls a behavior of the vehicle on the basis of a determination result of the determination unit of the information processing apparatus.

(13): According to another aspect of the present invention, there is provided an information processing method in which a computer acquires a detection result of a first detection unit which detects an object around a vehicle and a detection result of a second detection unit of which at least a part of a detection range overlaps a detection range of the first detection unit and which detects an object around the vehicle, and determines that the object has started to move in a case in which the vehicle and the object are in a halted state when a detection result of the first detection unit indicates that the object has started to move and a detection result of the second detection unit indicates that the object has started to move.

(14): According to another aspect of the present invention, there is provided a computer readable non-transitory storage medium storing a program for causing a computer to acquire a detection result of a first detection unit which detects an object around a vehicle and a detection result of a second detection unit of which at least a part of a detection range overlaps a detection range of the first detection unit and which detects an object around the vehicle, and to determine that the object has started to move in a case in which the vehicle and the object are in a halted state when a detection result of the first detection unit indicates that the object has started to move and a detection result of the second detection unit indicates that the object has started to move.

According to the aspects of (1) to (14) described above, it is possible to more accurately determine that an object has started to move. For example, in a case in which a vehicle and a different vehicle are halted compared to when they are moving, starting of the different vehicle is likely to be erroneously determined due to an influence of a detection error of a detection unit. However, even when a vehicle and a different vehicle are halted, the information processing apparatus can accurately determine and recognize that the different vehicle has started to move.

According to the aspect of (2) described above, the information processing apparatus can accurately recognize starting of movement of an object present in a region in which a behavior of an object affects a vehicle.

According to the aspect of (3) described above, the information processing apparatus can narrow down the number of determination targets which can be determination targets by using objects consecutively detected based on respective detection results of two or more detection units.

According to the aspects of (7) and (8) described above, in the information processing apparatus, erroneous determination can be curbed by recognizing that an object has not started to move when it is determined that the object has not started to move on the basis of detection results of two detection units.

According to the aspect of (10) described above, the first detection unit and the second detection unit have different functional configurations. Therefore, there is a low probability that each detection result will include a similar error. For this reason, the information processing apparatus can curb determining starting of movement of an object on the basis of an error and can more accurately determine starting of movement of an object.

According to the aspect of (12) described above, a vehicle refers to a determination result of the determination unit. Accordingly, it is possible to more accurately realize control according to a behavior of an object with favorable responsiveness.

BRIEF DESCRIPTION OF THE DRAWINGS

FIG. 7 is a view for describing a condition 1, a condition 2, and a condition 3.

FIG. 8 is a view showing an example of details of determination result information.

DETAILED DESCRIPTION OF THE INVENTION

Hereinafter, with reference to the drawings, embodiments of an information processing apparatus, a vehicle system, an information processing method, and a storage medium of the present invention will be described.

First Embodiment

[Overall Configuration]

Figure 1:
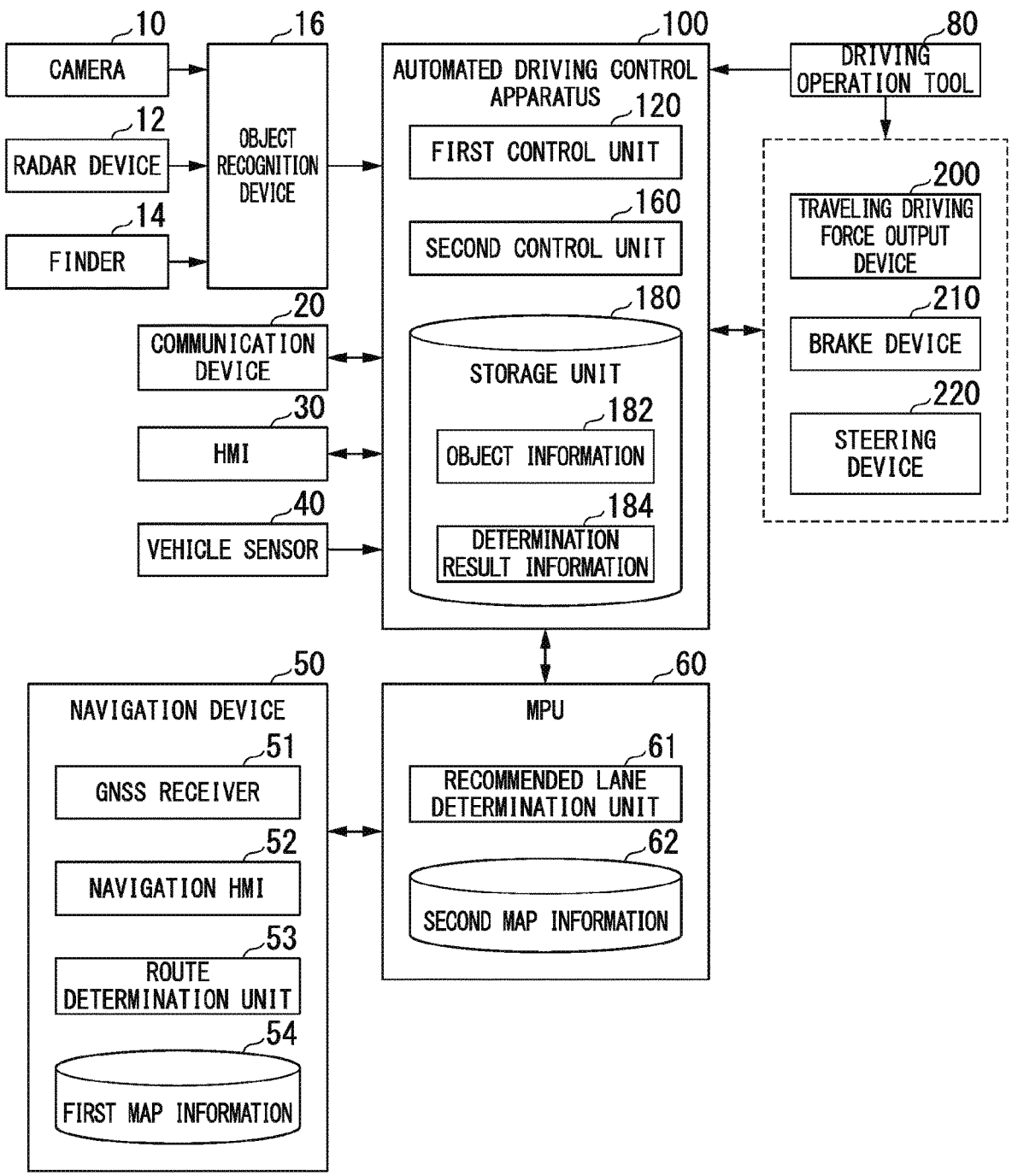
FIG. 1 is a view of a configuration of a vehicle system utilizing an information processing apparatus according to an embodiment.

FIG. 1 is a view of a configuration of a vehicle system 2 utilizing the information processing apparatus according to the embodiment. For example, a vehicle in which the vehicle system 2 is mounted is a vehicle with two wheels, three wheels, or four wheels, for example, and its driving source is an internal-combustion engine (a diesel engine or a gasoline engine), an electric motor, or a combination thereof. An electric motor operates using electric power generated by a generator joined to an internal-combustion engine, or discharged electric power of a secondary battery or a fuel cell.

For example, the vehicle system 2 includes a camera 10, a radar device 12, a finder 14, an object recognition device 16, a communication device 20, a human machine interface (HMI) 30, a vehicle sensor 40, a navigation device 50, a map positioning unit (MPU) 60, a driving operation tool 80, an automated driving control apparatus 100, a traveling driving force output device 200, a brake device 210, and a steering device 220. These devices and instruments are connected to one another through a multiplex communication line such as a controller area network (CAN) communication line, a serial communication line, a radio communication network, or the like. The configuration shown in FIG. 1 is merely an example. A part of the configuration may be omitted, or another configuration may further be added thereto.

For example, the camera 10 is a digital camera utilizing a solid-state image capturing element such as a charge coupled device (CCD) or a complementary metal oxide semiconductor (CMOS). The camera 10 is attached to an arbitrary place on a vehicle (hereinafter, a host vehicle M) in which the vehicle system 2 is mounted. In a case of capturing an image in front, the camera 10 is attached to an upper portion of a front windshield, a rear surface of a rearview mirror, or the like. For example, the camera 10 captures images around the host vehicle M in a periodically repeated manner. The camera 10 may be a stereo camera.

The radar device 12 radiates electric waves such as millimeter waves around the host vehicle M and detects at least a position (a distance and an azimuth) of an object by detecting electric waves reflected (reflected waves) by the object. The radar device 12 is attached to an arbitrary place in the host vehicle M. The radar device 12 may detect a position and a speed of an object by a frequency modulated continuous wave (FM-CW) method.

The finder 14 is light detection and ranging (LIDAR) finder. The finder 14 emits light around the host vehicle M and measures scattered light. The finder 14 detects a distance to a target on the basis of a time taken from light emission to light reception. For example, emitted light is pulsed laser light. The finder 14 is attached to an arbitrary place in the host vehicle M.

The object recognition device 16 recognizes the position, the kind, the speed, and the like of an object by performing sensor fusion processing with respect to detection results of some or all of the camera 10, the radar device 12, and the finder 14. The object recognition device 16 outputs a recognition result to the automated driving control apparatus 100. The object recognition device 16 may output detection results of the camera 10, the radar device 12, and the finder 14 to the automated driving control apparatus 100 without any change. The object recognition device 16 may be omitted from the vehicle system 2.

The object recognition device 16 may provide detection results of some or all of the camera 10, the radar device 12, and the finder 14 to the automated driving control apparatus 100. In this case, the automated driving control apparatus 100 (a recognition unit 130, which will be described below) recognizes the position, the kind, the speed, and the like of an object on the basis of the foregoing detection results or by performing processing of integrating the detection results.

For example, the communication device 20 communicates with a different vehicle which is present around the host vehicle M utilizing a cellular network, a Wi-Fi network, Bluetooth (registered trademark), dedicated short range communication (DSRC), or the like or communicates with various server devices via a radio base station.

The HMI 30 presents various kinds of information to an occupant of the host vehicle M and receives an input operation of the occupant. The HMI 30 includes various display devices, a speaker, a buzzer, a touch panel, a switch, a key, and the like.

The vehicle sensor 40 includes a vehicle speed sensor for detecting a speed of the host vehicle M, an acceleration sensor for detecting an acceleration, a yaw rate sensor for detecting an angular velocity around a vertical axis, an azimuth sensor for detecting a direction of the host vehicle M, and the like.

For example, the navigation device 50 includes a global navigation satellite system (GNSS) receiver 51, a navigation HMI 52, and a route determination unit 53. The navigation device 50 retains first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or complemented by an inertial navigation system (INS) utilizing an output of the vehicle sensor 40. The navigation HMI 52 includes a display device, a speaker, a touch panel, a key, and the like. The navigation HMI 52 may be partially or entirely in common with the HMI 30 described above. For example, with reference to the first map information 54, the route determination unit 53 determines a route (hereinafter, a route on a map) from the position of the host vehicle M (or an arbitrary input position) identified by the GNSS receiver 51 to a destination input by an occupant using the navigation HMI 52. For example, the first map information 54 is information in which shapes of roads are expressed using links which indicate roads and nodes which are connected to each other by the links. The first map information 54 may include curvatures of roads, point of interest (POI) information, and the like. A route on the map is output to the MPU 60. The navigation device 50 may perform route guidance using the navigation HMI 52 on the basis of a route on the map. For example, the navigation device 50 may be realized by means of a function of a terminal device such as a smartphone or a tablet terminal possessed by an occupant. The navigation device 50 may transmit a current position and a destination to a navigation server via the communication device 20 and acquire a route equivalent to a route on the map from the navigation server.

For example, the MPU 60 includes a recommended lane determination unit 61 and retains second map information 62 in a storage device such as an HDD or a flash memory. The recommended lane determination unit 61 divides a route on the map provided from the navigation device 50 into a plurality of blocks (for example, divides a route on the map every 100 [m] in a vehicle proceeding direction) and determines a recommended lane for each block with reference to the second map information 62. The recommended lane determination unit 61 determines which lane from the left to travel along. When a branch point is present on a route on the map, the recommended lane determination unit 61 determines a recommended lane such that the host vehicle M can travel on a reasonable route in order to proceed to the branch destination.

The second map information 62 is map information having higher accuracy than the first map information 54. For example, the second map information 62 includes information regarding middle parts of lanes, information regarding boundaries of lanes, and the like. The second map information 62 may include road information, traffic regulation information, address information (address and zip code), facility information, telephone number information, and the like. The second map information 62 may be updated any time by means of the communication device 20 through communication with a different device. The map information may include lanes of roads, road marking lines marking lanes of roads, and the like.

For example, the driving operation tool 80 includes an accelerator pedal, a brake pedal, a shift lever, a steering wheel, a steering wheel having a different shape, a joystick, and other operation tools. A sensor for detecting an operation amount or the presence or absence of operation is attached to the driving operation tool 80, and a detection result thereof is output to some or all of the automated driving control apparatus 100 or the traveling driving force output device 200, the brake device 210, and the steering device 220.

For example, the automated driving control apparatus 100 includes a first control unit 120, a second control unit 160, and a storage unit 180. For example, each of the first control unit 120 and the second control unit 160 is realized by a hardware processor such as a central processing unit (CPU) executing a program (software). Some or all of these constituent elements may be realized by hardware (a circuit unit; including circuitry) such as a large scale integration (LSI), an application specific integrated circuit (ASIC), a field-programmable gate array (FPGA), or a graphics processing unit (GPU) or may be realized by software and hardware in cooperation. A program may be stored in a storage device (a storage device including a non-transitory storage medium) such as an HDD or a flash memory of the automated driving control apparatus 100 in advance or may be stored in an attachable/detachable storage medium such as a DVD or a CD-ROM such that the program is installed in the HDD or the flash memory of the automated driving control apparatus 100 when a storage medium (a non-transitory storage medium) is mounted in a drive device. The storage unit 180 includes object information 182 and determination result information 184. These pieces of information will be described below in detail. The automated driving control apparatus 100 is an example of "a vehicle control apparatus".

Figure 2:
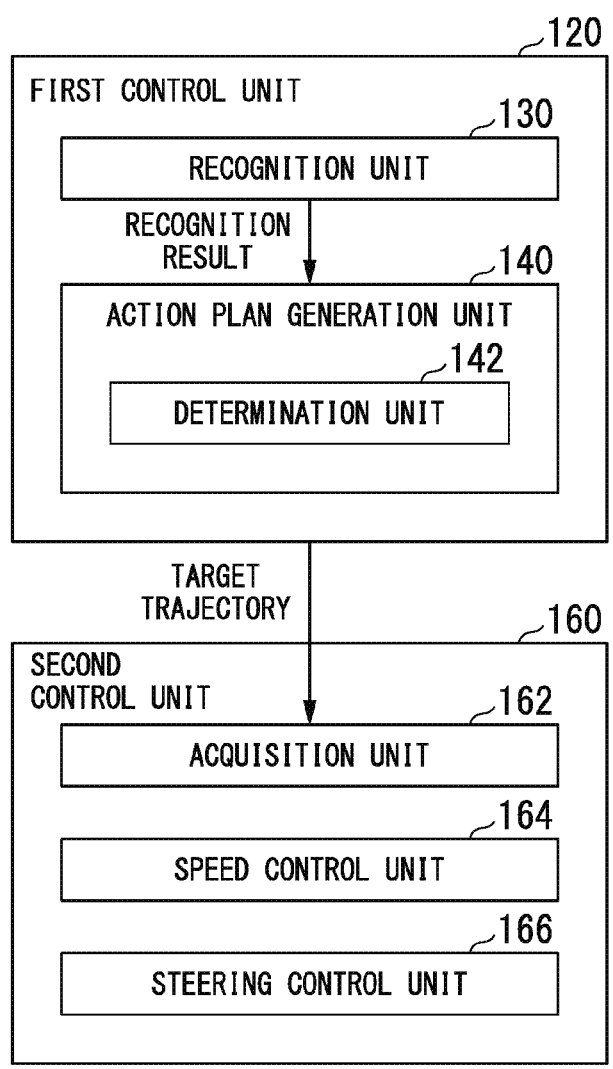
FIG. 2 is a view of functional configurations of a first control unit and a second control unit.

FIG. 2 is a view of functional configurations of the first control unit 120 and the second control unit 160. For example, the first control unit 120 includes the recognition unit 130 and an action plan generation unit 140. For example, the first control unit 120 realizes functions conducted by artificial intelligence (AI) and functions conducted in accordance with a model given in advance in parallel. For example, a function of "recognizing an intersection" may be realized by executing recognition of an intersection by deep learning or the like and recognition based on conditions (there are signals, road signs, and the like which can be subjected to pattern matching) given in advance in parallel and performing scoring and comprehensive evaluation with respect to both thereof. Accordingly, reliability of automated driving is ensured.

The recognition unit 130 recognizes states such as the position, and the speed, the acceleration, or the like of an object around the host vehicle M on the basis of information input from the camera 10, the radar device 12, or the finder 14 via the object recognition device 16. For example, the position of an object is recognized as a position on absolute coordinates having a representative point (the center of gravity, a drive shaft center, or the like) of the host vehicle M as an origin and is used for controlling. The position of an object may be indicated as a representative point such as the center of gravity or a corner of the object or may be indicated as an expressed region. A "state" of an object may include an acceleration or a jerk of an object, or "a behavior state" (for example, a state of making a lane change or a state in which a lane change is intended).

The action plan generation unit 140 generates a target trajectory along which the host vehicle M will automatically (independently of operations of a driver) travel in the future such that the host vehicle M can essentially travel in a recommended lane determined by the recommended lane determination unit 61 and can further cope with the circumstances around the host vehicle M. For example, a target trajectory includes a speed element. For example, a target trajectory is expressed as a trajectory in which locations (trajectory points) at which the host vehicle M will arrive are sequentially arranged. These trajectory points are locations at which the host vehicle M will arrive after each of respective predetermined traveling distances (for example, approximately every several meters) with respect to a distance along a road. Other than this, a target speed and a target acceleration are generated as a part of the target trajectory for each predetermined sampling time (for example, approximately every several tenths of a second). The trajectory points may be positions at which the host vehicle M will arrive at sampling times after each of respective predetermined sampling times. In this case, information of the target speed or the target acceleration is expressed with respect to intervals between the trajectory points.

When a target trajectory is generated, the action plan generation unit 140 may set an event of automated driving. An event of automated driving includes a constant speed traveling event, a low-speed following traveling event, a lane change event, a branching event, a merging event, a take-over event, and the like. Following denotes that the vehicle M is traveling behind a preceding vehicle in a state in which an interval with respect to a vehicle traveling in front of the vehicle is being maintained at a predetermined distance. The action plan generation unit 140 generates a target trajectory according to a started event. For example, when a target trajectory is generated, the action plan generation unit 140 generates a target trajectory by adding a determination result of a determination unit 142 which will be described below.

For example, the action plan generation unit 140 includes the determination unit 142. The determination unit 142 determines whether or not an object has started to move on the basis of at least detection results of a first detection unit and a second detection unit included in a plurality of detection units. Hereinafter, this determination processing may be referred to as "identification determining processing". The identification determining processing will be described below in detail.

The second control unit 160 controls the traveling driving force output device 200, the brake device 210, and the steering device 220 such that the host vehicle M passes along a target trajectory generated by the action plan generation unit 140 at scheduled times.

Returning to FIG. 2, for example, the second control unit 160 includes an acquisition unit 162, a speed control unit 164, and a steering control unit 166. The acquisition unit 162 acquires information of a target trajectory (trajectory points) generated by the action plan generation unit 140 and stores the information in a memory (not shown in the diagram). The speed control unit 164 controls the traveling driving force output device 200 or the brake device 210 on the basis of the speed element incidental to the target trajectory stored in the memory. The steering control unit 166 controls the steering device 220 in accordance with curvature conditions of the target trajectory stored in the memory. For example, processing of the speed control unit 164 and the steering control unit 166 is realized by a combination of feedforward control and feedback control. As an example, the steering control unit 166 executes feedforward control according to the curvature of a road in front of the host vehicle M and feedback control based on a deviation from the target trajectory in combination.

The traveling driving force output device 200 outputs a traveling drive force (a torque) for causing a vehicle to travel to driving wheels. For example, the traveling driving force output device 200 includes a combination of an internal-combustion engine, an electric motor, a transmission, and the like and an electronic control unit (ECU) for controlling these. The ECU controls the foregoing constituents in accordance with information input from the second control unit 160 or information input from the driving operation tool 80.

For example, the brake device 210 includes a brake caliper, a cylinder for transmitting a hydraulic pressure to the brake caliper, an electric motor for causing the cylinder to generate a hydraulic pressure, and a brake ECU. The brake ECU controls the electric motor in accordance with information input from the second control unit 160 or information input from the driving operation tool 80 such that a brake torque according to a brake operation is output to each wheel. The brake device 210 may include, as a back-up, a mechanism for transmitting a hydraulic pressure generated in response to an operation of the brake pedal included in the driving operation tool 80 to the cylinder via a master cylinder. The brake device 210 is not limited to the configuration described above and may be an electronically controlled hydraulic brake device which controls an actuator in accordance with information input from the second control unit 160 and transmits a hydraulic pressure of the master cylinder to the cylinder.

For example, the steering device 220 includes a steering ECU and an electric motor. For example, the electric motor changes the direction of steered wheels by causing a force to act on a rack-and-pinion mechanism. The steering ECU changes the direction of the steered wheels by driving the electric motor in accordance with information input from the second control unit 160 or information input from the driving operation tool 80.

[Overview of Identification Determining Processing]

The determination unit 142 determines that an object has started to move in a case in which the vehicle M and the object are in a halted state (or substantially in a halted state at a predetermined speed or slower) when at least a detection result of the first detection unit indicates that the object has started to move and a detection result of the second detection unit indicates that the object has started to move. At least a part of a detection range of the second detection unit overlaps a detection range of the first detection unit. For example, in the present embodiment, a plurality of detection units includes the camera 10, the radar device 12, and the finder 14. Each of the first detection unit and the second detection unit is any of the camera 10, the radar device 12, or the finder 14. For example, the second detection unit may have a functional configuration of the camera 10, the radar device 12, or the finder 14 different from that of the first detection unit, and the first detection unit and the second detection unit may be detection units having equivalent functional configurations. For example, when the first detection unit is the camera 10, the second detection unit may be the radar device 12 or the finder 14. For example, when the vehicle system 2 includes a first camera and a second camera, the first detection unit may be the first camera and the second detection unit may be the second camera.

It is more favorable that the first detection unit and the second detection unit have different functional configurations than having the same functional configurations. That is, the first detection unit may be a detection unit of a first classification and the second detection unit may be a detection unit having a functional configuration different from the functional configuration of the first classification. If the first detection unit and the second detection unit have different functional configurations, there is a low probability that a similar error will be included in the detection results of the first detection unit and the second detection unit due to the same timings, factors, and the like. For this reason, determining starting of movement of an object on the basis of an error is curbed, and thus the determination unit 142 can more accurately determine starting of movement of an object.

[Flowchart (Part 1)]

Figure 3:
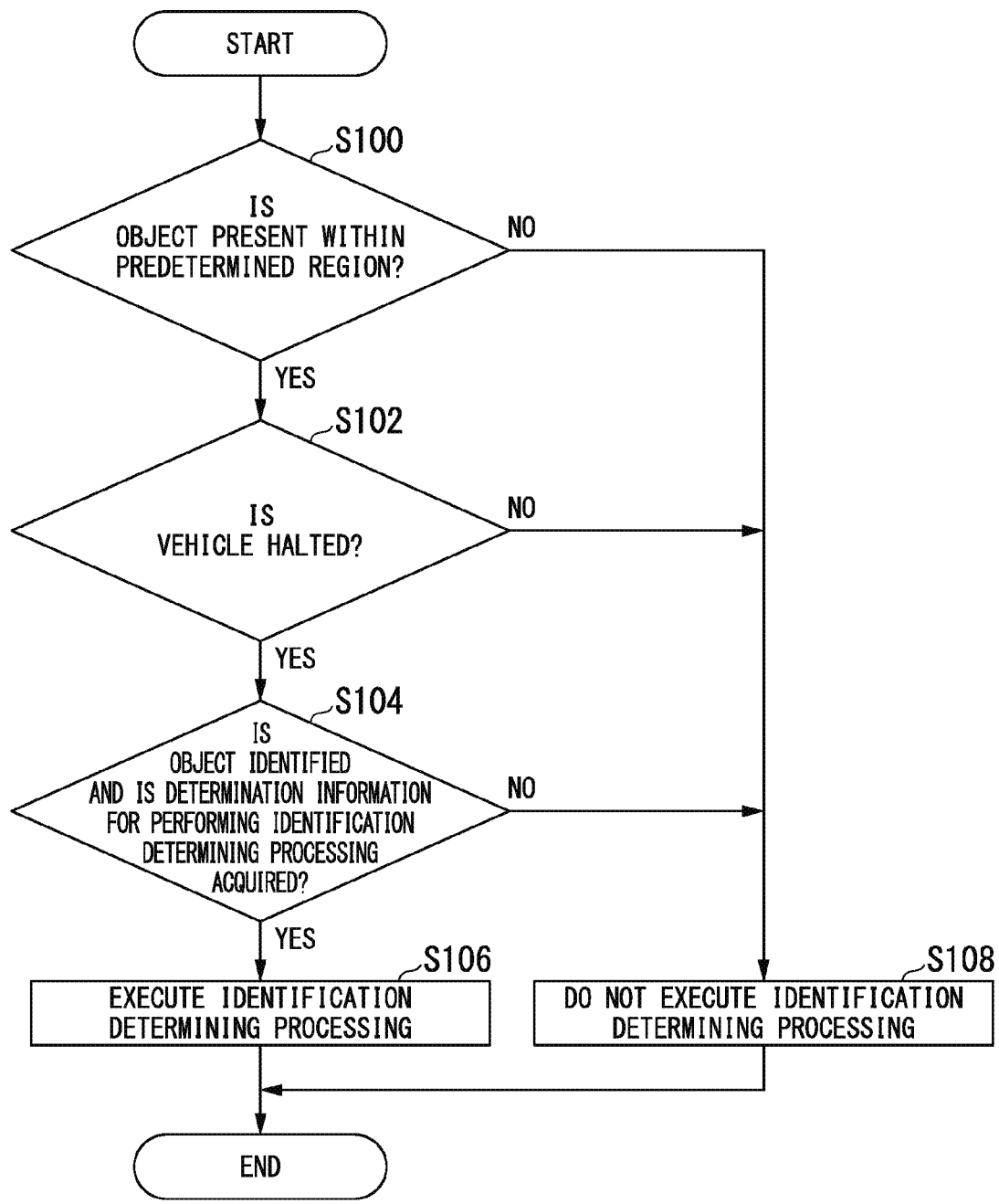
FIG. 3 is a flowchart (Part 1) showing an example of a flow of processing executed by an automated driving control apparatus.

FIG. 3 is a flowchart (Part 1) showing an example of a flow of processing executed by the automated driving control apparatus 100. This flowchart is processing for the determination unit 142 determining whether or not to execute identification determining processing. A part of FIG. 3 and processing of each flowchart which will be described below may be omitted, and the sequence of the processing may be changed suitably.

First, the determination unit 142 determines whether or not an object is present within a predetermined region (Step S100). When an object is present within the predetermined region (refer to FIG. 4, which will be described below), the determination unit 142 determines whether or not the vehicle M is halted (or whether or not the vehicle M is substantially in a halted state at a predetermined speed or slower) (Step S102). When the vehicle M is halted, the determination unit 142, with reference to the object information 182, determines whether or not an object has been identified and determination information for performing identification determining processing has been acquired (Step S104). The object information 182 and determination information will be described below in detail.

When an object is identified and determination information is acquired, the determination unit 142 executes identification determining processing (Step S106). When an object has not been identified, or when an object is identified but no determination information is acquired, the determination unit 142 does not execute identification determining processing (Step S108). When a negative determination is made in the determination of Step S102 and Step S104, the processing of Step S108 is performed. Accordingly, the processing of this flowchart ends.

[Regarding Predetermined Region]

Figure 4:
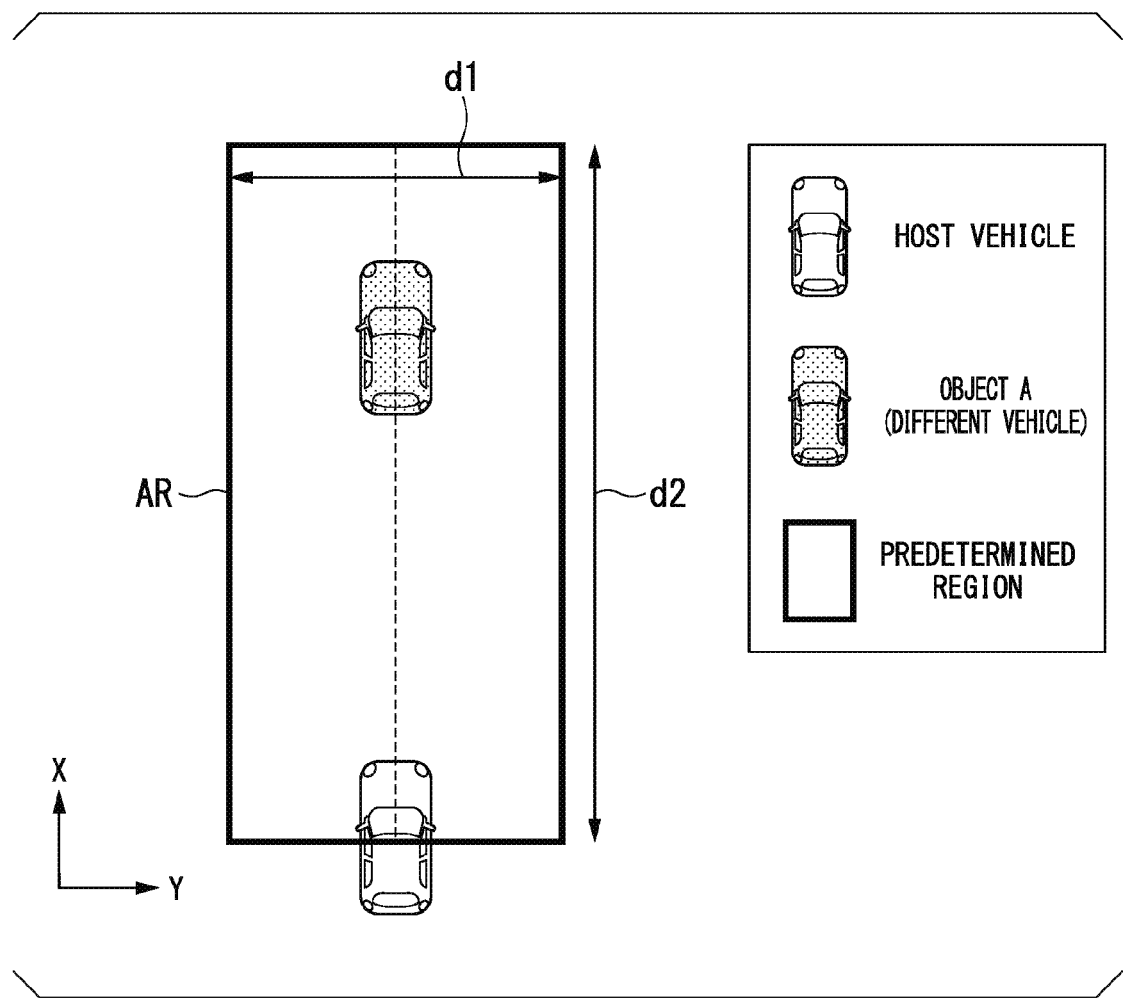
FIG. 4 is a view showing an example of a predetermined region and an object present within the predetermined region.

FIG. 4 is a view showing an example of a predetermined region and an object present within the predetermined region. Hereinafter, a proceeding direction of the vehicle M may be referred to as an X direction and a width direction of the vehicle M may be referred to as a Y direction. A predetermined region AR is a region in which a range of a first distance d1 in the positive Y direction and the negative Y direction from a reference position (for example, the center of gravity) of the vehicle M extends from the reference position in the positive X direction over a second distance d2. It is assumed that an object is an object A (a different vehicle) which is present in front of the vehicle M. The determination unit 142 determines whether or not the object A is identified and determination information is acquired when the vehicle M is halted and the object A is present within the predetermined region AR.

[Regarding Object Information and Determination Information]

Figure 5:
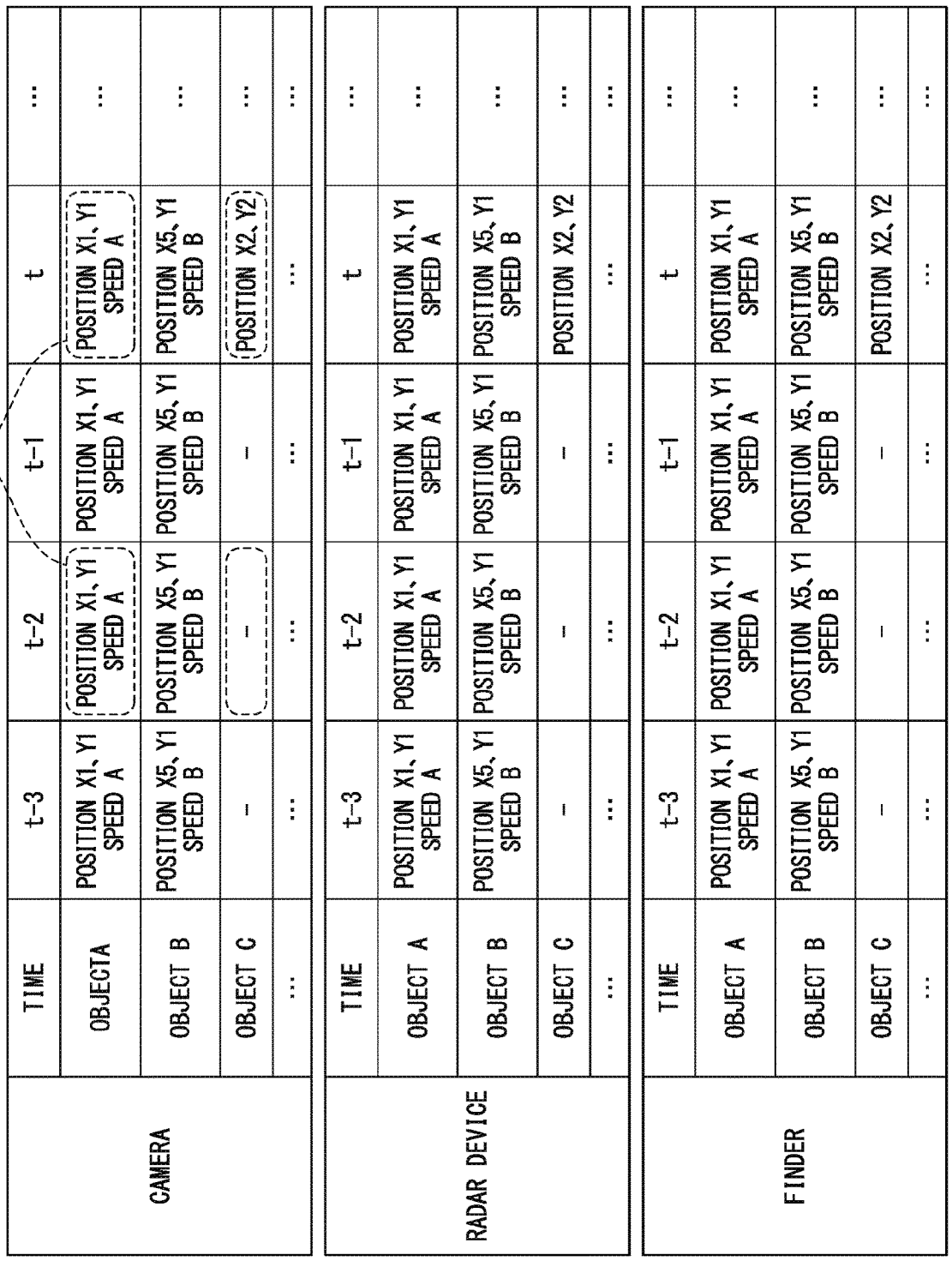
FIG. 5 is a view showing an example of details of object information.

FIG. 5 is a view showing an example of details of the object information 182. The object information 182 is information including detection results of a plurality of detection units. For example, the object information 182 includes information obtained on the basis of a detection result of the camera 10, information obtained on the basis of a detection result of the radar device 12, and information obtained on the basis of a detection result of the finder 14. For example, information obtained on the basis of a detection result is information in which identification information of an object and the position or the speed of the object for each time are associated with each other. The position or the speed of an object for each time is a state (a position or a speed) of an object acquired on the basis of the detection result for each processing cycle of the detection unit.

With reference to the object information 182, the determination unit 142 determines whether or not an object is identified. In the example of FIG. 5, regarding the object A, the object A is recognized in the detection results of the plurality of detection units at a different timing, and the recognition result of this object A is included in the object information 182. For this reason, the determination unit 142 determines that the object A has been identified. For example, when the object A (the same object) is recognized in the detection result of the camera 10 obtained at a different timing, the determination unit 142 determines that the object A has been identified in the detection result of the camera 10. Similar to that described above, the determination unit 142 determines whether or not the object A is identified in each of the detection result of the radar device 12 obtained at a different timing and the detection result of the finder 14 obtained at a different timing. For example, the recognition unit 130 recognizes that objects recognized at different times are the same object (identifies objects) on the basis of a tracking technique such as a Kalman filter.

The determination unit 142 determines whether or not determination information for performing identification determining processing is acquired. The determination unit 142 determines that determination information has been acquired when a state of the object A detected by the first detection unit at a different timing is acquired and a state of the object A detected by the second detection unit at a different timing is acquired.

As shown in the processing of the flowcharts of FIGS. 6 and 9 which will be described below, the determination unit 142 determines whether or not identification determining processing has been executed and the object has started to move when the object A is identified in detection results of a predetermined number (at least two) of detection units, and the state of the object A detected by the first detection unit at a different timing and the state of the object A detected by the second detection unit at a different timing are further acquired. A predetermined number of detection units indicate two or more target detection units and are the camera 10, the radar device 12, and the finder 14 in the present embodiment, for example. In the object information 182 associated with each of the target detection units (or two or more detection units), when a predetermined object (for example, the object A) is identified and determination information related to the predetermined object is acquired, the determination unit 142 executes identification determining processing (related to the object A).

For example, the determination unit 142 determines that determination information has been acquired when the state of the object A at a current time (for example, a time t) and the state (in the diagram, S) of the object A at a time (for example, a time t−2) before the current time are included in the object information 182. That is, when states of an object are recognized at different times, it is determined that determination information has been acquired. In the example of FIG. 5, in the object information 182 associated with the camera 10, determination information related to the object A is acquired, and determination information related to an object C is not acquired.

In the foregoing example, the determination unit 142 determines whether or not the state of the object at the time t and the state of the object at the time t−2 are included in the object information 182. However, in place thereof, the determination unit 142 may determine whether or not the states of the object at different arbitrary times are included in the object information 182. For example, two favorable times may be determined on the basis of an experimental result or a simulation result, and these times may be used.

As described above, the determination unit 142 determines whether or not conditions for performing identification determining processing are satisfied, and identification determining processing is performed when the conditions are satisfied. Therefore, unnecessary identification determining processing is curbed, and thus a processing load can be reduced.

[Flowchart (Part 2)]

Figure 6:
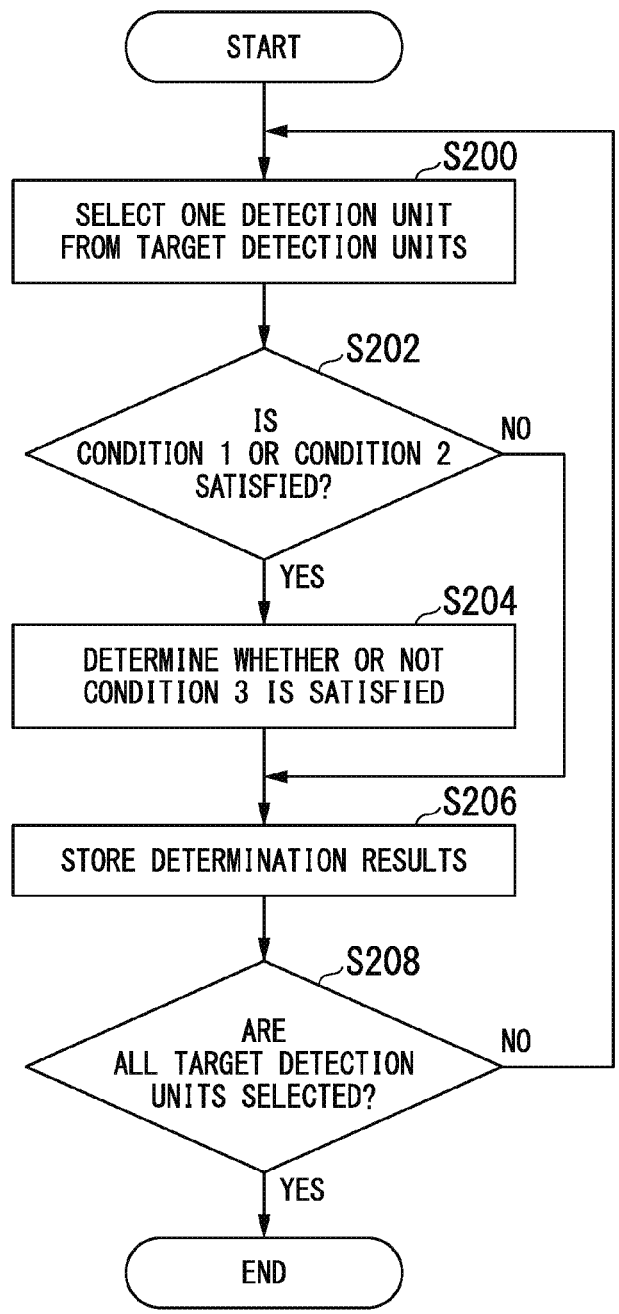
FIG. 6 is a flowchart (Part 2) showing an example of a flow of identification determining processing executed by the automated driving control apparatus.

FIG. 6 is a flowchart (Part 2) showing an example of a flow of identification determining processing executed by the automated driving control apparatus 100. A condition 1, a condition 2, and a condition 3 in this flowchart will be described below.

First, the determination unit 142 selects one detection unit from target detection units (Step S200). Next, with reference to the object information 182, the determination unit 142 determines whether or not a target object satisfies the condition 1 or the condition 2 (Step S202). A target object is an object (for example, the object A which is a different vehicle) recognized on the basis of the detection result of the detection unit selected in Step S100. When a target object does not satisfy the condition 1 or the condition 2, the process proceeds to the processing of Step S206.

When a target object satisfies the condition 1 or the condition 2, the determination unit 142 determines whether or not the target object satisfies the condition 3 (Step S204). Next, the determination unit 142 stores the determination results in Step S202 or Steps S202 and S204 in the storage unit (Step S206). Accordingly, the determination result information 184 (refer to FIG. 8) is generated. A condition including one or both of the condition 1 and the condition 2, or a condition including a condition, which includes one or both of the condition 1 and the condition 2, and the condition 3 is an example of "a first condition".

Next, the determination unit 142 determines whether or not all the target detection units have been selected (Step S208). When all the target detection units have not been selected, the determination unit 142 returns to the processing of Step S200, selects a detection unit which has not been selected, and executes the processing of Steps S202 to S206. Accordingly, the processing of this flowchart ends.

FIG. 7 is a view for describing the condition 1, the condition 2, and the condition 3. The condition 1, the condition 2, and the condition 3 are as follows.

Condition 1: a current speed of a target object is equal to or higher than a threshold A (for example, 1.2 m/sec). When a current speed of a target object is equal to or higher than the threshold A, even if the condition 2 is not satisfied, it is considered that the target object has started to move. The threshold A is an example of "a fourth threshold".

Condition 2: two or more conditions of the following conditions (a), (b), and (c) are satisfied. Even if the condition 1 is not satisfied, when the condition 2 (two or more conditions of the conditions (a) to (c)) is satisfied, it is considered that the target object has started to move. Each of the conditions (a) to (c) is a condition more moderate than the condition 1. That is, even if the condition 1 is not satisfied, when a plurality of conditions more moderate than the condition 1 are satisfied, it is considered that the target object has started to move.

Condition (a): a current speed of a target object is equal to or higher than a threshold a (for example, 0.8 m/sec). The threshold a is a value smaller than the threshold A.

Condition (b): a value obtained by subtracting a speed of a target object a predetermined time before from a current speed of the target object is equal to or higher than a threshold b (for example, 0.5 m/sec). The threshold b is a value smaller than the threshold a.

Condition (c): a current position of a target object deviates from a position of the target object a predetermined time before by a threshold c (for example, 0.4 m) or larger.

The threshold a is an example of "a first threshold", the threshold b is an example of "a second threshold", and the threshold c is an example of "a third threshold".

Condition 3: a target object is moving in a direction (X direction) in which the target object is away from the vehicle M. In other words, a current speed of a target object is positive. For example, even when an error occurs such that an object is moving in the negative X direction and the condition 1 or the condition 2 is satisfied on the basis of the detection result of the detection unit, it is possible to accurately determine starting of a target object in the positive X direction due to the presence of the condition 3.

As described above, starting of movement of an object is determined accurately and promptly and an erroneous determination is curbed due to the condition 3 by varying the values of the thresholds related to the speed between the condition 1 and the condition 2 (conditions (a) and (b)). In this manner, the determination unit 142 can curb erroneous determination and can determine starting of movement of an object promptly and accurately using the condition 1, the condition 2, and the condition 3.

In the condition 3, in place of (in addition to) determining starting in the positive X direction, movement in the negative X direction (or a predetermined direction) may be determined. The determination unit 142 may determine a direction in which a target object has moved on the basis of a moving direction of the target object.

FIG. 8 is a view showing an example of details of the determination result information 184. For example, FIG. 8 is an example of the determination result information 184 related to a predetermined target object (for example, the object A). As shown in FIG. 8, the determination result information 184 includes information indicating that a target object satisfies or does not satisfy each of the conditions for each detection unit and information indicating an integrated determination result for each detection unit. An integrated determination result is information indicating a result in which the determination unit 142 has determined whether or not a target object has started on the basis of one detection result of the detection unit. For example, the determination unit 142 causes the determination result information 184 to include information, as an integrated determination result, indicating that a target object has started when the condition 1 or the condition 2 is satisfied and the condition 3 is satisfied, and causes the determination result information 184 to include information, as an integrated determination result, indicating that a target object has not started when the condition 1 or the condition 2 is not satisfied or the condition 3 is not satisfied.

When all or some of the condition 1, the condition (a), the condition (b), the condition (c), and the condition 3 described above are satisfied, the determination unit 142 may determine that a target object has moved. The term "some" denotes an arbitrary condition and indicates an arbitrary combination of the condition 1 and the condition (b), or the like, for example.

[Flowchart (Part 3)]

Figure 9:
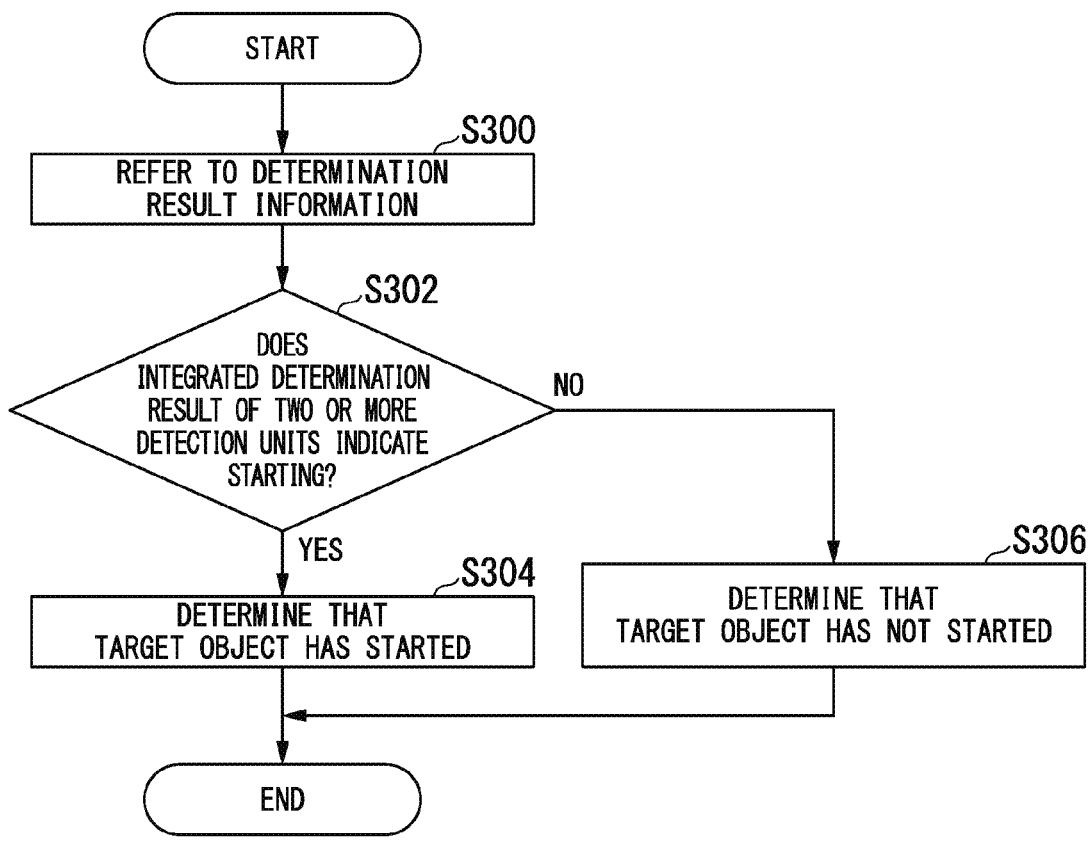
FIG. 9 is a flowchart (Part 3) showing an example of a flow of processing executed by the automated driving control apparatus.

FIG. 9 is a flowchart (Part 3) showing an example of a flow of processing executed by the automated driving control apparatus 100. The processing of this flowchart is processing executed after the processing of the flowchart of FIG. 6 or in parallel with the processing of the flowchart of FIG. 6.

First, with reference to the determination result information 184 (Step S300), the determination unit 142 determines whether or not an integrated determination result of two or more detection units indicates that a target object has started (Step S302). In other words, the determination unit 142 determines whether or not two or more detection units have provided a detection result in which a target object has satisfied the condition 1 or the condition 2 and has satisfied the condition 3.

When an integrated determination result of two or more detection units indicates that a target object has started, the determination unit 142 determines that the target object has started (Step S304). When an integrated determination result of two or more detection units does not indicate that a target object has started, the determination unit 142 determines that the target object has not started (Step S306). Accordingly, the processing of this flowchart ends.

As described above, the determination unit 142 can more accurately determine that an object has started to move by determining whether or not a target object has started on the basis of an integrated determination result. For example, in addition to the example described in FIG. 10, this determination result is used for controlling various kinds of vehicles M.

[Flowchart (Part 4)]

Figure 10:
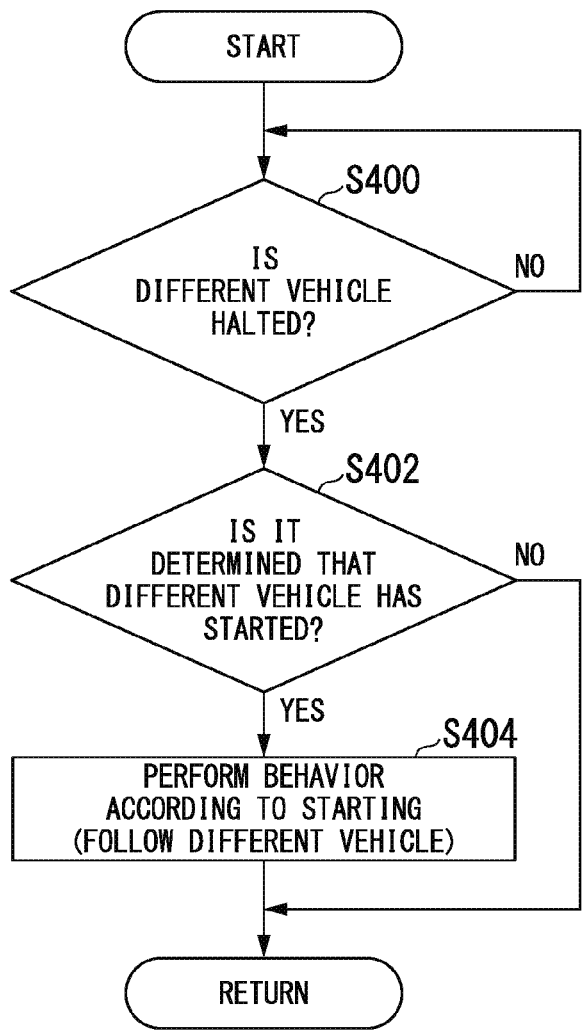
FIG. 10 is a flowchart (Part 4) showing an example of a flow of processing executed by the automated driving control apparatus.

FIG. 10 is a flowchart (Part 4) showing an example of a flow of processing executed by the automated driving control apparatus 100. For example, this flowchart is processing executed when the vehicle M is in a predetermined mode. The identification determining processing described above may also be executed when the vehicle M is in a predetermined mode. A predetermined mode indicates a traveling mode of following a preceding vehicle which travels immediately in front of the vehicle M, a traveling mode of starting the vehicle M in response to starting of a preceding vehicle, a traffic jam pilot (TJP) mode, or the like. For example, the TJP mode is a mode in which the vehicle M follows a preceding vehicle at a predetermined speed (for example, 60 [km/h]) or slower when a degree of congestion of a road is equal to or higher than a predetermined degree.

First, the automated driving control apparatus 100 determines whether or not a different vehicle is halted (Step S400). When a different vehicle is halted, the action plan generation unit 140 determines whether or not the determination unit 142 has determined that the different vehicle has started (Step S402). When the determination unit 142 has not determined that the different vehicle has started, one routine processing of this flowchart ends. When the determination unit 142 has determined that the different vehicle has started, the action plan generation unit 140 performs a behavior according to starting of the different vehicle (Step S404). For example, the action plan generation unit 140 causes the vehicle to start and follow the different vehicle. Accordingly, the processing of this flowchart ends. As described above, when it is determined that a different vehicle has started, the automated driving control apparatus 100 may simply notify the vehicle M (or an occupant) that the different vehicle has started, in place of (in addition to) causing the vehicle M to start.

Comparative Example

Figure 11:
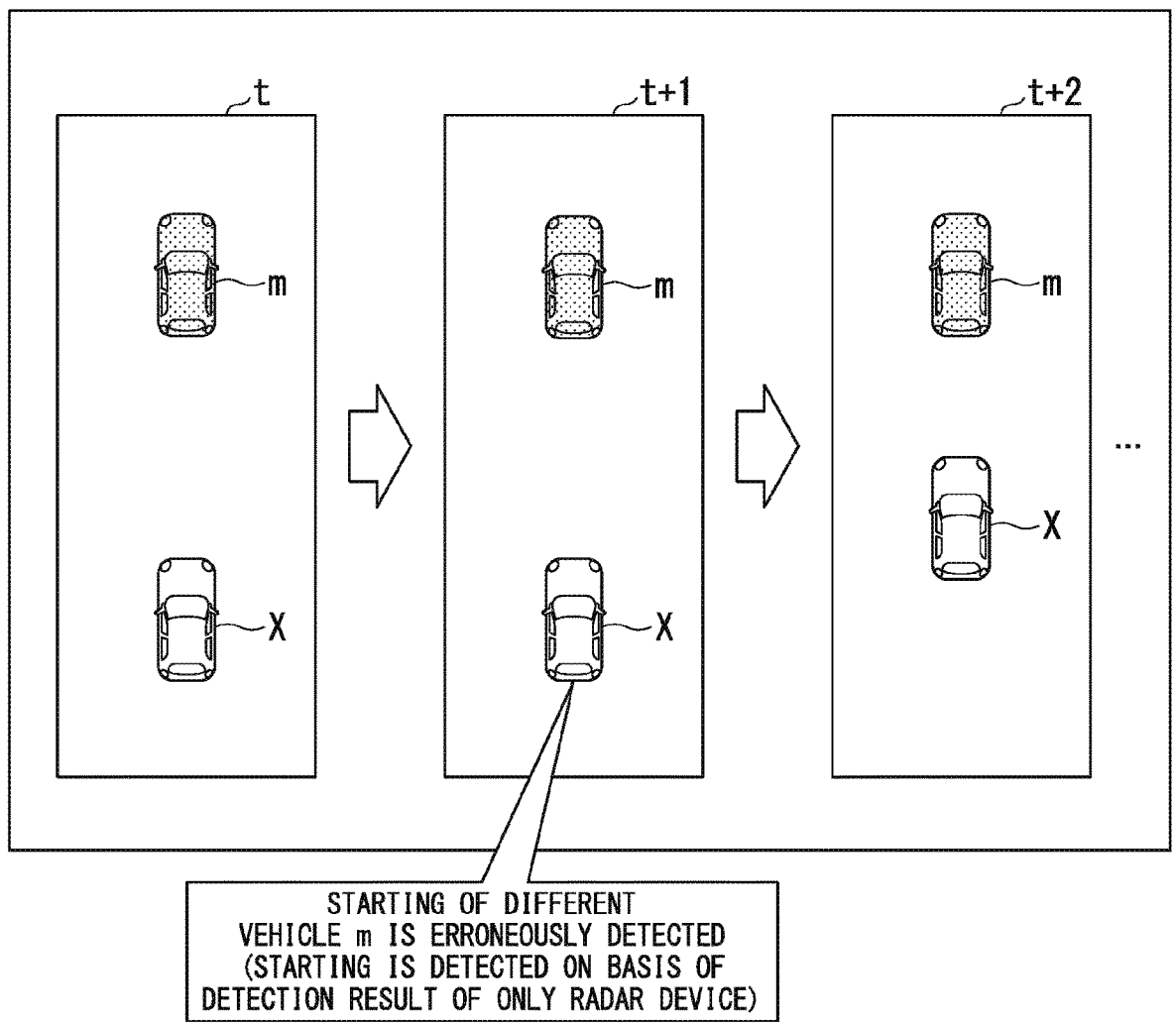
FIG. 11 is a view showing a scene in which an automated driving control apparatus of a comparative example controls a vehicle.

FIG. 11 is a view showing a scene in which an automated driving control apparatus of a comparative example controls a vehicle X. The automated driving control apparatus of the comparative example does not execute identification determining processing and causes the vehicle X to start, for example, on the basis of the detection result of a predetermined detection unit (for example, any detection unit) when it is determined that a different vehicle has started. At the time t, the vehicle X and a different vehicle m are halted. At a time t+1, the different vehicle m is in a halted state. However, for example, it is assumed that the vehicle X has determined that the different vehicle m has started on the basis of the detection result of the radar device. For example, the automated driving control apparatus of the comparative example has not detected starting of the different vehicle m on the basis of the detection results of other detection units (the camera and the finder), or the detection results of other detection units are not taken into consideration. At a time t+2, the vehicle X starts on the basis of the determination result at the time t+1. In this manner, even when the different vehicle m is halted, the vehicle X may start due to a cause of erroneous detection of the detection unit.

Present Embodiment

Figure 12:
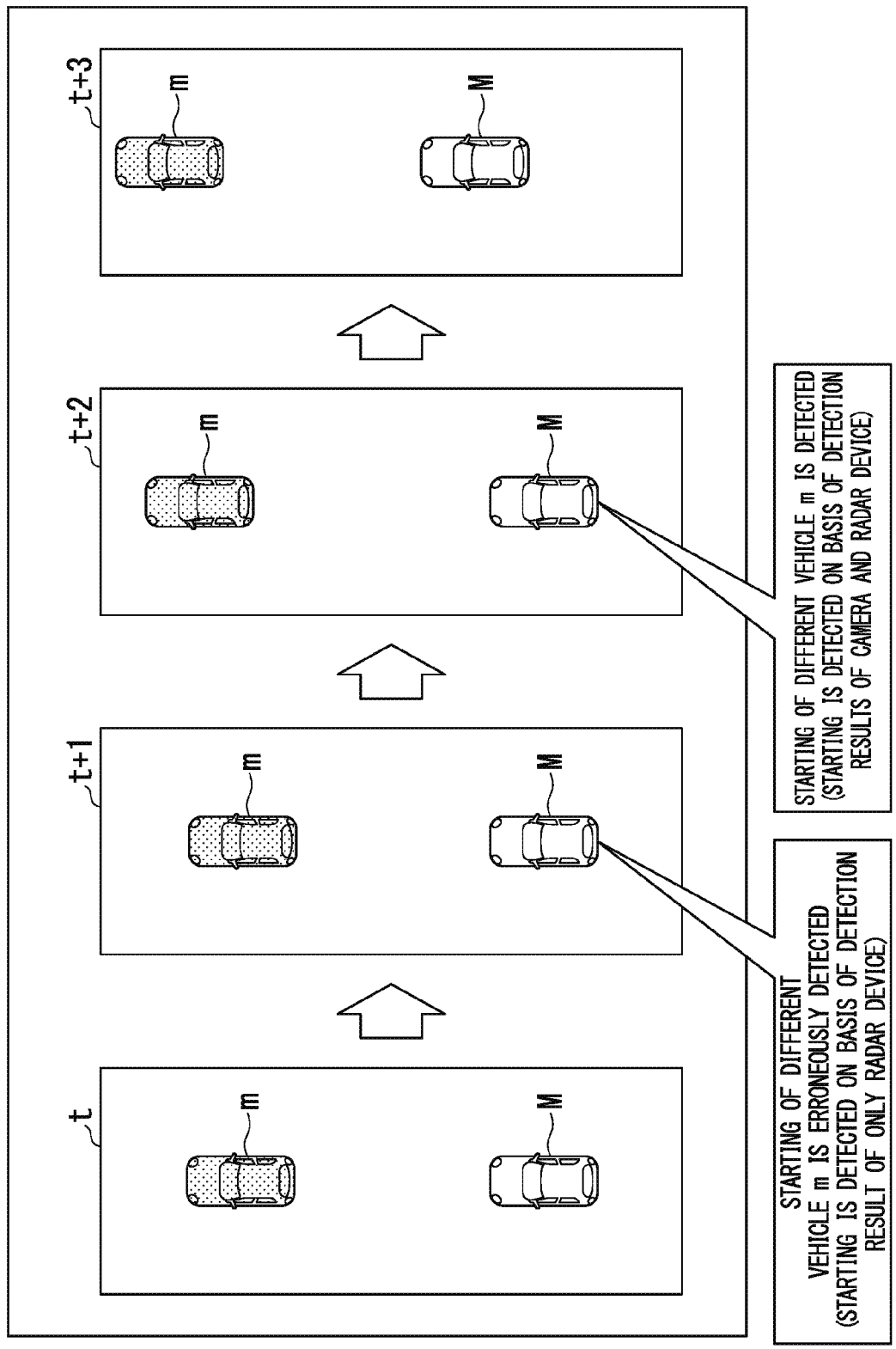
FIG. 12 is a view showing a scene in which the automated driving control apparatus of the present embodiment controls the vehicle.

FIG. 12 is a view showing a scene in which the automated driving control apparatus 100 of the present embodiment controls the vehicle M. At the time t, the vehicle M and the different vehicle m are halted. At the time t+1, the different vehicle m is in a halted state. However, for example, it is assumed that the vehicle M has determined that the different vehicle m has started on the basis of the detection result of the radar device. However, the automated driving control apparatus 100 has not detected starting of the different vehicle m on the basis of the detection results of other detection units (the camera and the finder). In this case, the automated driving control apparatus 100 does not cause the vehicle M to start since starting of the different vehicle m has not been determined.

At the time t+2, for example, the automated driving control apparatus 100 has determined that the different vehicle m has started on the basis of the detection results of two or more detection units. At a time t+3, the automated driving control apparatus 100 causes the vehicle M to start on the basis of the determination result at the time t+2 and follows the different vehicle m.

In this manner, the automated driving control apparatus 100 can curb starting of the vehicle M even when starting of the different vehicle m is determined on the basis of the detection result of a predetermined detection unit, and the vehicle M can be started with favorable responsiveness when starting of the different vehicle m is determined on the basis of the detection result of at least two predetermined detection units.

Here, when determining starting of the different vehicle m using the detection result of a predetermined (one) detection unit, the automated driving control apparatus 100 may determine that the different vehicle m has started even though the different vehicle m has not started. For example, a detection result of a detection unit may be slightly vibrated (blurred) in the X direction of the vehicle M. The automated driving control apparatus 100 may determine that an object is moving even when the detection result of the detection unit is recognized such that the position of the object has deviated due to slight vibration.

In contrast, the automated driving control apparatus 100 of the present embodiment determines that an object has started to move in a case in which the vehicle M and the object are in a halted state when at least it is determined that the object has started to move on the basis of the detection result of the first detection unit and the object has started to move on the basis of the detection result of the second detection unit, and thus it is possible to accurately recognize that the object has started to move.

When the vehicle M is moving, even if there is slight vibration, the vehicle M is also moving in the X direction. Therefore, the influence of slight vibration related to determination of the state of the different vehicle m is small. In other words, the degree of influence of an error, which is related to a relative speed between the vehicle M and an object when the vehicle M is moving, with respect to the behavior of the vehicle M is small. For this reason, the automated driving control apparatus 100 of the present embodiment executes identification determining processing when the vehicle M and an object are in a halted state (substantially in a halted state) and does not execute identification determining processing when the vehicle M is traveling at a predetermined speed or faster. As a result, an apparatus processing load of the automated driving control apparatus 100 in a case in which the vehicle M is traveling at a predetermined speed or faster is reduced.

According to the first embodiment described above, the determination unit 142 determines that an object has started to move in a case in which the vehicle M and the object are in a halted state when at least the detection result of the first detection unit indicates that the object has started to move and the detection result of the second detection unit indicates that the object has started to move, and thus it is possible to more accurately recognize that an object has started to move.

Second Embodiment

Hereinafter, a second embodiment will be described. In the second embodiment, the determination unit 142 determines that an object has started to move in a case in which the vehicle M and the object are in a halted state (or substantially in a halted state at a predetermined speed or slower) when it is determined that the object has started to move on the basis of a predetermined number of detection results and it is determined that the object has moved on the basis of the detection result of the detection unit equal to or higher than the threshold. Hereinafter, differences between the first embodiment and the second embodiment will be described mainly.

Figure 13:
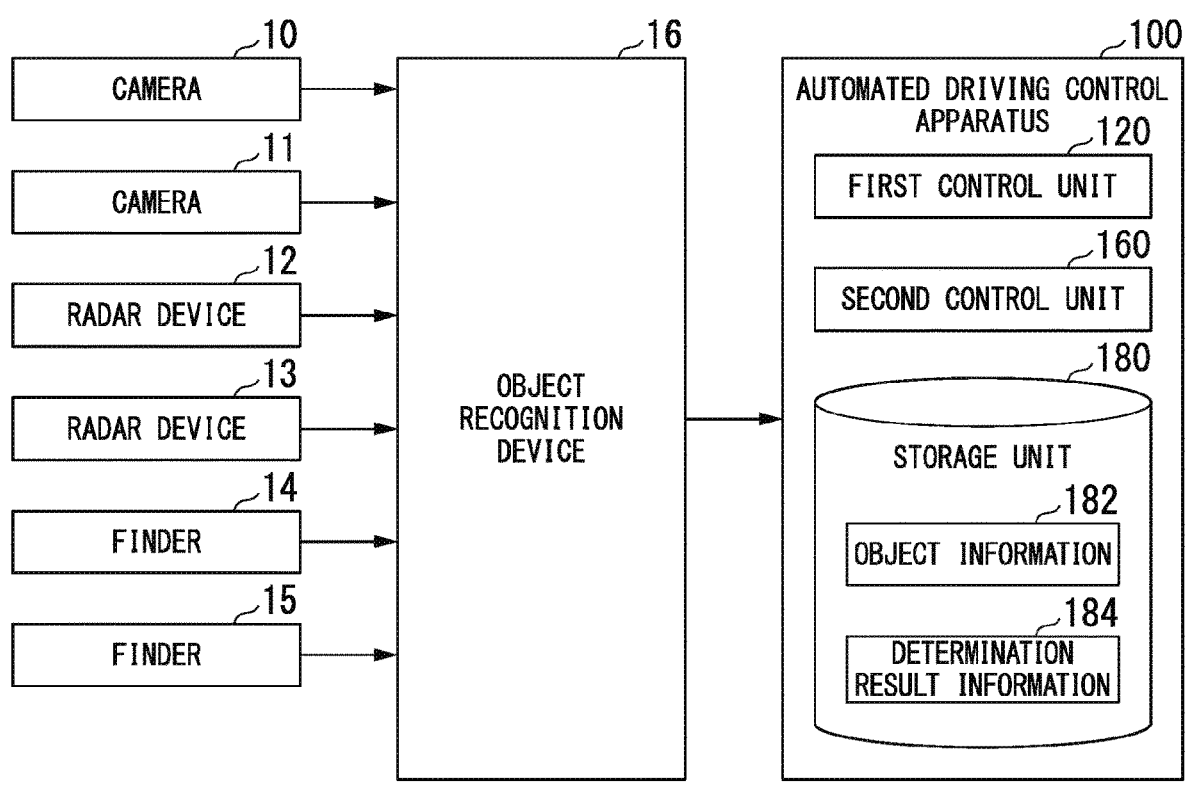
FIG. 13 is a view showing an example of a vehicle system of a second embodiment.

FIG. 13 is a view showing an example of a vehicle system 2A of the second embodiment. The vehicle system 2A further includes a camera 11, a radar device 13, and a finder 15, in addition to the functional configuration of the vehicle system 2. In the shown example, functional configurations other than the camera 10, the radar device 12, the finder 14, the object recognition device 16, and the automated driving control apparatus 100 are omitted. The camera 10, the camera 11, the radar device 12, the radar device 13, the finder 14, and the finder 15 are an example of "a plurality of detection units" of which at least parts of detection ranges overlap each other. The camera 11 has a functional configuration similar to that of the camera 10, the radar device 13 has a functional configuration similar to that of the radar device 12, and the finder 15 has a functional configuration similar to that of the finder 14.

For example, the determination unit 142 determines whether or not an object has started to move on the basis of each of the detection results of the camera 10, the camera 11, the radar device 12, the radar device 13, the finder 14, and the finder 15. The determination unit 142 determines that an object has moved when it is determined that the object has moved on the basis of the detection result of the detection unit equal to or higher than a determination threshold. For example, the determination threshold is a threshold for determining half or a majority of the target detection units. The determination unit 142 may determine that an object has not moved when the number of affirmative determination results is not equal to or higher than a predetermined determination threshold in the detection results of the plurality of detection units.

According to the second embodiment described above, the determination unit 142 determines whether or not an object has started to move for each detection result of each of the detection units included in the plurality of detection units when the vehicle and the object are in a halted state and determines that the object has started to move when the number of affirmative determination results is equal to or higher than a threshold in the determination result, and thus effects similar to those in the first embodiment are exhibited. In the foregoing second embodiment, it is described that the plurality of detection units includes two cameras, two radar devices, and two finders. However, the plurality of detection units may be two or more detection units of the camera, the radar device, and the finder or may be two or more detection units of two cameras, two radar devices, and two finders.

Third Embodiment

Hereinafter, a third embodiment will be described. The determination unit 142 of the third embodiment determines that an object has not started to move when at least a detection result of a third detection unit included in the plurality of detection units indicates that the object has not started to move and a detection result of a fourth detection unit indicates that the object has not started to move.

Hereinafter, differences between the first embodiment or the second embodiment and the third embodiment will be described mainly.

For example, the determination unit 142 determines that an object has not moved when at least the state of the object does not satisfy the first condition on the basis of the detection result of the third detection unit included in the plurality of detection units and the state of the object does not satisfy the first condition on the basis of the detection result of the fourth detection unit.

For example, as in the vehicle system 2A of the second embodiment, the camera 10 to the finder 15 are included. For example, it is assumed that the camera 10 is "a first detection unit", the camera 11 is "a second detection unit", the radar device 12 is "a third detection unit", and the radar device 13 is "a fourth detection unit". In this case, for example, the determination unit 142 determines that an object has moved on the basis of each detection result of the camera 10 and the camera 11. However, the determination unit 142 determined that an object has not moved when it is determined that the object has not moved on the basis of each detection result of the radar device 12 and the radar device 13.

Figure 14:
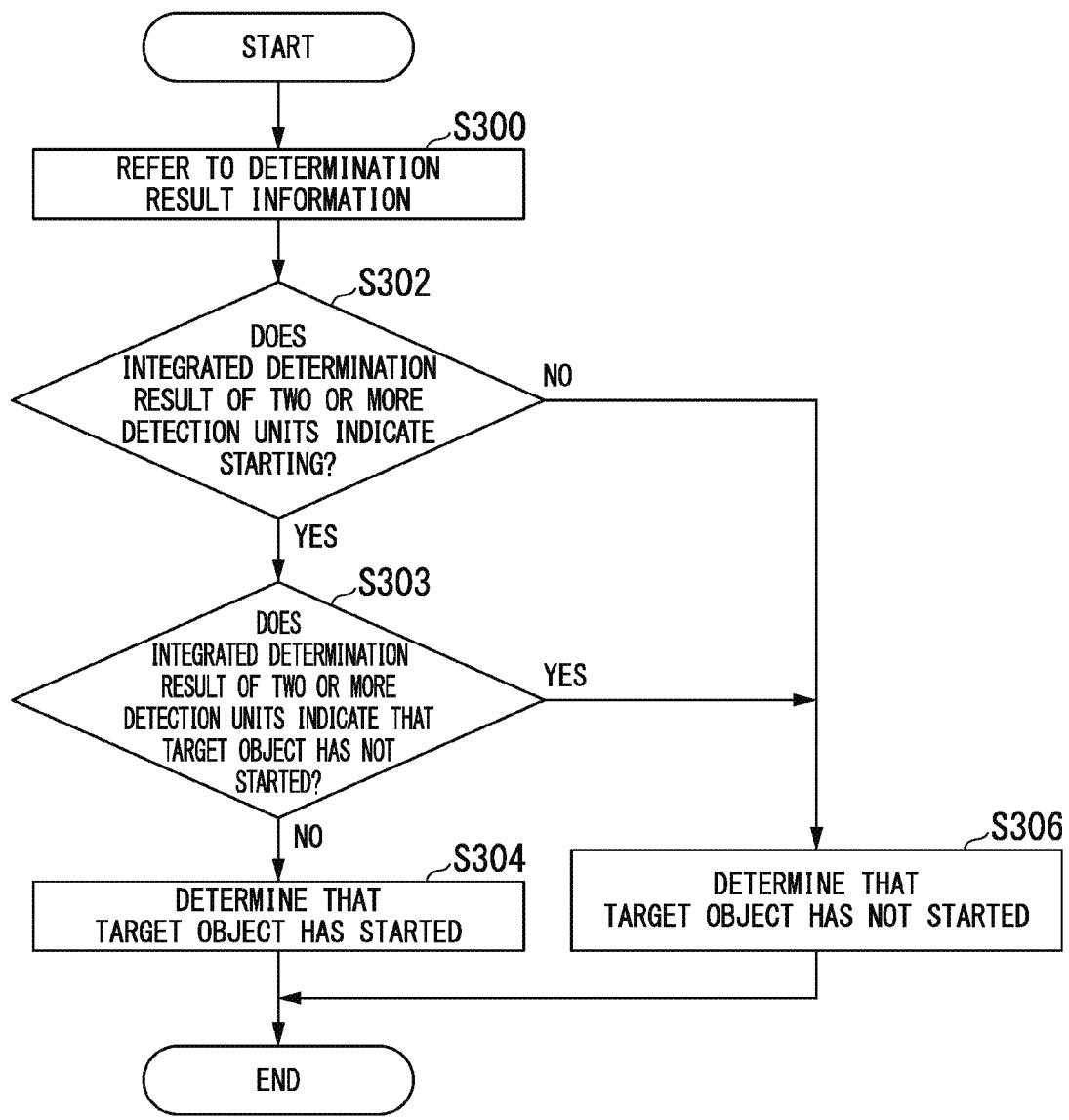
FIG. 14 is a flowchart showing an example of a flow of processing executed by an automated driving control apparatus of a third embodiment.

FIG. 14 is a flowchart showing an example of a flow of processing executed by the automated driving control apparatus 100 of the third embodiment. Differences between the flowchart of FIG. 9 and this flowchart will be described. For example, when it is determined in Step S302 that the integrated determination result of two or more detection units indicates starting, the determination unit 142 determines whether or not the integrated determination result of two or more detection units does not indicate starting (Step S303). When a negative determination result is obtained in the determination of Step S303, the determination unit 142 determines that a target object has started (Step S304). When it is determined that the integrated determination result of two or more detection units does not indicate starting, the determination unit 142 determines the target object has not started (Step S306). Accordingly, the processing of this flowchart ends. The determination of Step S303 may be executed before Step S302.

According to the third embodiment described above, the determination unit 142 determines whether or not the integrated determination result of two or more detection units does not indicate starting, and thus starting of movement of an object can be more accurately recognized.

Fourth Embodiment

Hereinafter, a fourth embodiment will be described. In the first embodiment, an example in which the determination unit 142 is included in the automated driving control apparatus 100 and the automated driving control apparatus 100 utilizes the determination result of the determination unit 142 has been described. In contrast, in the second embodiment, the determination unit 142 is included in a driving support control device.

Figure 15:
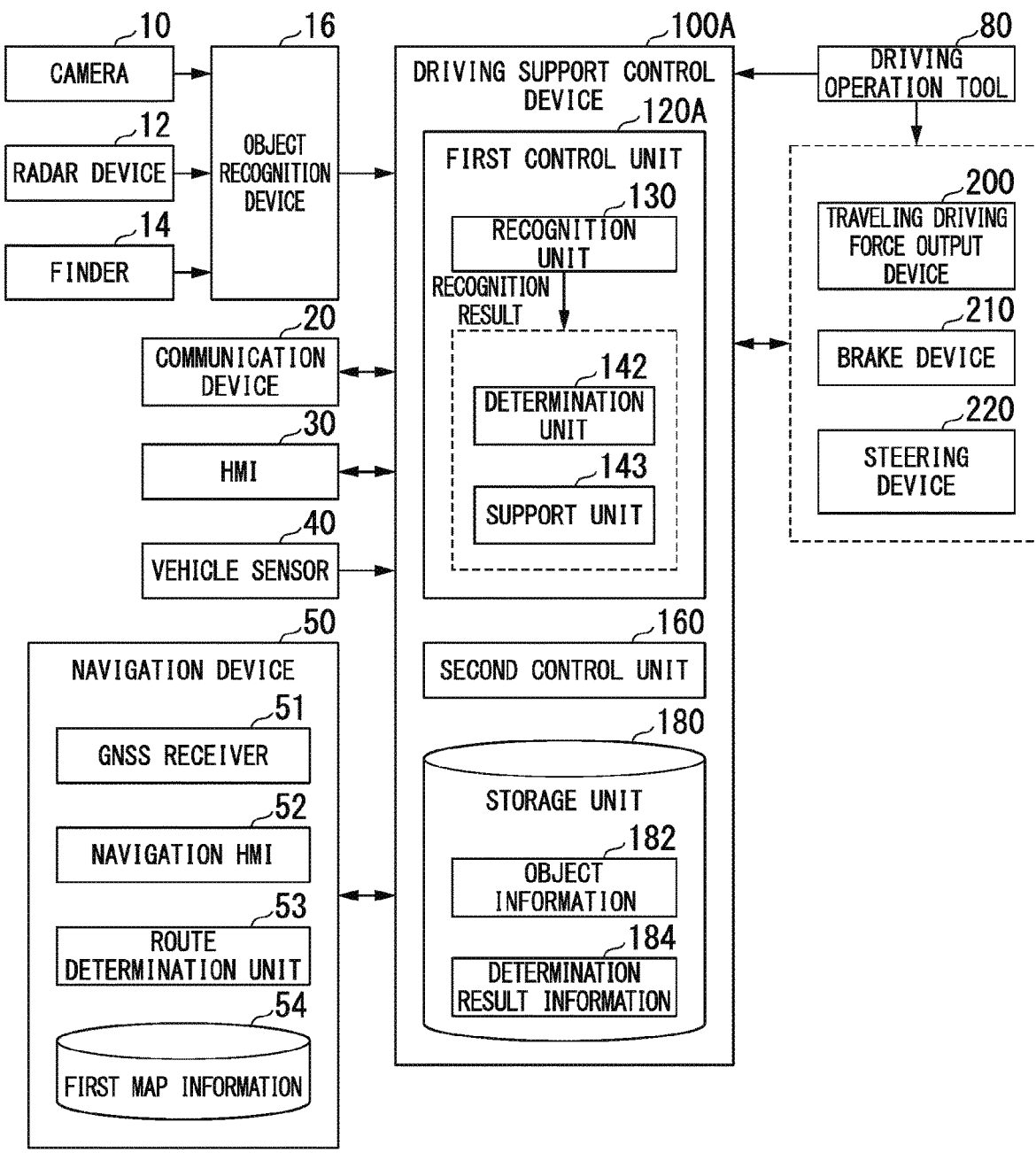
FIG. 15 is a view showing an example of a functional configuration of a vehicle system of a fourth embodiment.

FIG. 15 is a view showing an example of a functional configuration of a vehicle system 2B of the fourth embodiment. Description of functional configurations similar to those of the vehicle system 2A will be omitted. The vehicle system 2B includes a driving support control device 100A. In the vehicle system 2B, the MPU 60 is omitted.

For example, the driving support control device 100A includes a first control unit 120A, the second control unit 160, and the storage unit 180. The first control unit 120A includes the recognition unit 130, the determination unit 142, and a support unit 143. For example, the support unit 143 controls the vehicle M on the basis of a predetermined set mode (for example, the TJP mode). The support unit 143 controls the vehicle M in response to starting of the different vehicle m on the basis of the determination result of the determination unit 142.

According to the driving support control device 100A of the fourth embodiment described above, effects similar to those in the first embodiment are exhibited.

[Hardware Configuration]

Figure 16:
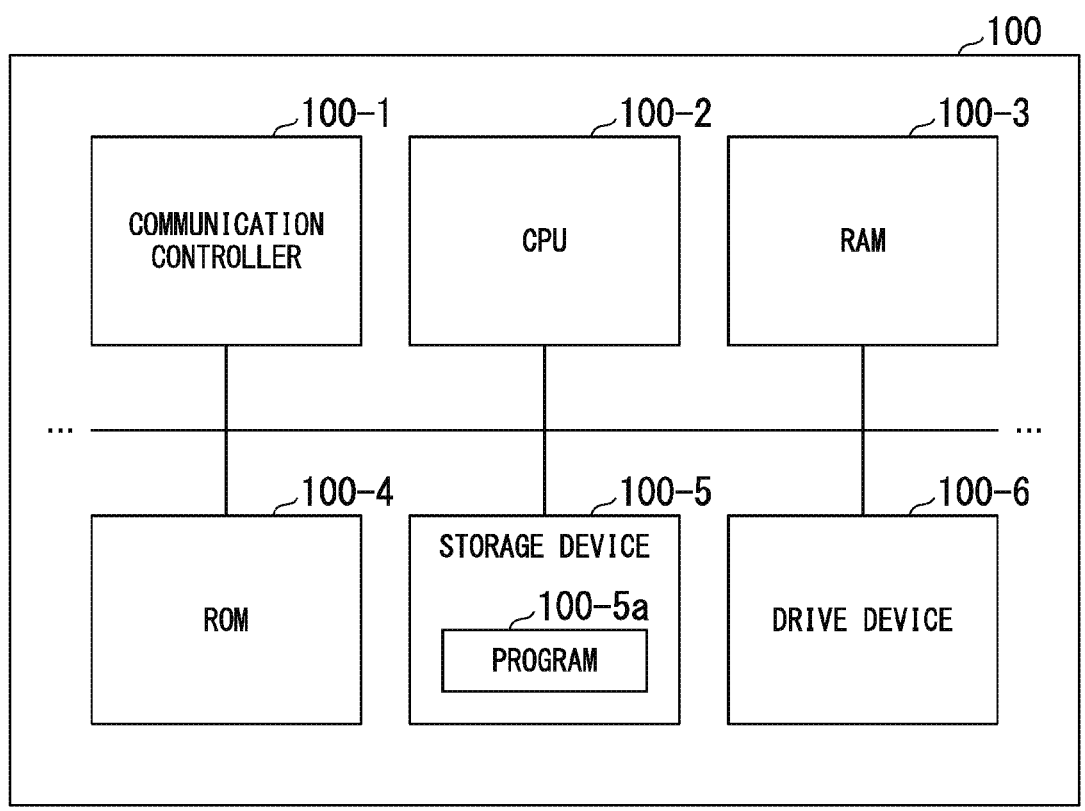
FIG. 16 is a view showing an example of a hardware configuration of the automated driving control apparatus of the embodiment.

FIG. 16 is a view showing an example of a hardware configuration of the automated driving control apparatus 100 of the embodiment. As shown in the diagram, the automated driving control apparatus 100 has a configuration in which a communication controller 100-1, a CPU 100-2, a random access memory (RAM) 100-3 used as a working memory, a read only memory (ROM) 100-4 storing a booting program and the like, a storage device 100-5 such as a flash memory or a hard disk drive (HDD), a drive device 100-6, and the like are connected to one another through an internal bus or a dedicated communication line. The communication controller 100-1 performs communication with the constituent elements other than the automated driving control apparatus 100. A program 100-5a executed by the CPU 100-2 is stored in the storage device 100-5. This program is developed in the RAM 100-3 by a direct memory access (DMA) controller (not shown in the diagram) or the like and is executed by the CPU 100-2. Accordingly, a part or both of the recognition unit 130 and the action plan generation unit 140 are realized.

The embodiments described above can be expressed as follows.

An information processing apparatus includes a storage device which stores a program, and a hardware processor. Through execution of the program stored in the storage device, the hardware processor acquires a detection result of a first detection unit which detects an object around a vehicle and a detection result of a second detection unit of which at least a part of a detection range overlaps a detection range of the first detection unit and which detects an object around the vehicle, and the hardware processor determines that the object has started to move in a case in which the vehicle and the object are in a halted state when a detection result of the first detection unit indicates that the object has started to move and a detection result of the second detection unit indicates that the object has started to move.

Hereinabove, forms for performing the present invention have been described using the embodiments, but the present invention is not limited to such embodiments in any way, and various modifications and replacements can be added within a range not departing from the gist of the present invention.

What is claimed is:

1. An information processing apparatus comprising:
   a first detection unit that detects an object around a vehicle;
   a second detection unit having a detection range that at least partially overlaps a detection range of the first detection unit and that detects the object around the vehicle;
   a determination unit that determines whether the object starts to move based on detection results of the first detection unit and the second detection unit; and
   a vehicle control apparatus that controls a behavior of the vehicle based on a determination result of the determination unit,
   wherein
   the determination unit determines that the object starts to move in a case in which the vehicle and the object are in a halted state in response to a detection result of the first detection unit indicating that the object starts to move from the halted state and a detection result of the second detection unit indicating that the object starts to move from the halted state, the determination unit starts a process of determining whether the object starts to move in response to determining that the vehicle is in the halted state or substantially in the halted state at a predetermined speed or slower, and the object is identified based on a detection result detected by the first detection unit at different timings and the object is identified based on a detection result detected by the second detection unit at the different timings before the process is started, otherwise the determination unit does not execute the process, and the determination unit determines that the object starts to move in response to determining that a state of the object satisfies two or more conditions based on a detection result of the first detection unit and determining that the state of the object satisfies the two or more conditions based on a detection result of the second detection unit.

2. The information processing apparatus according to claim 1,
wherein the determination unit determines that the object starts to move in a case in which the vehicle and the object are in the halted state and the object is present within a predetermined range in front of the vehicle in response to a detection result of the first detection unit indicating that the object starts to move from the halted state and a detection result of the second detection unit indicating that the object starts to move from the halted state.

3. The information processing apparatus according to claim 1, wherein
the determination unit determines that the object has moved in response to determining that a state of the object satisfies a first condition based on the detection result of the first detection unit and determining that a state of the object satisfies the first condition based on the detection result of the second detection unit, and
the first condition is one or both of a current speed of the object being equal to or greater than a fourth threshold and a state of the object satisfying at least two conditions of a condition a, a condition b, and a condition c,
the condition a is that a current speed of the object is equal to or higher than a first threshold,
the condition b is that a current speed of the object is higher than a speed of the object a predetermined time before a current time by a second threshold or greater, and
the condition c is that a current position of the object is away from a position of the object a predetermined time before by a third threshold or greater.

4. The information processing apparatus according to claim 3, further comprising:
a third detection unit having a detection range that at least partially overlaps the detection range of the first detection unit and the detection range of the second detection unit and that detects the object around the vehicle; and
a fourth detection unit having a detection range that at least partially overlaps the detection range of the first detection unit, the detection range of the second detection unit, and the detection range the third detection unit and that detects the object around the vehicle, wherein the determination unit confirms that the object has not moved in response to determining that a state of the object does not satisfy the first condition based on a detection result of the third detection unit and determining that a state of the object does not satisfy the first condition based on a detection result of the fourth detection unit.

5. The information processing apparatus according to claim 1, wherein
the determination unit determines that the object has moved in response to determining that a state of the object satisfies a first condition based on the detection result of the first detection unit and determining that a state of the object satisfies the first condition based on the detection result of the second detection unit, and
the first condition is one or both of
a current speed of the object being equal to or greater than a fourth threshold and a state of the object satisfying at least two conditions of a condition a, a condition b, and a condition c, and
the object moving in a direction in which the object is being away from the vehicle,
the condition a is that a current speed of the object is equal to or higher than a first threshold,
the condition b is that a current speed of the object is higher than a speed of the object a predetermined time before a current time by a second threshold or greater, and
the condition c is that a current position of the object is away from a position of the object a predetermined time before by a third threshold or greater.

6. The information processing apparatus according to claim 1, further comprising:
a third detection unit having a detection range that at least partially overlaps the detection range of the first detection unit and the detection range of the second detection unit and that detects the object around the vehicle; and
a fourth detection unit having a detection range that at least partially overlaps the detection range of the first detection unit, the detection range of the second detection unit, and the detection range of the third detection unit and that detects the object around the vehicle,
wherein the determination unit determines that the object has not started to move in a case in which the vehicle and the object are in the halted state in response to a detection result of the third detection unit indicating that the object has not started to move and a detection result of the fourth detection unit indicating that the object has not started to move.

7. The information processing apparatus according to claim 1,
wherein each of the first detection unit and the second detection unit is any one of
a camera configured to capture an image of scenery around the vehicle,
a radar device configured to radiate electric waves around the vehicle and detect the object based on reflected waves of the radiated electric waves from the object, or
an optical apparatus configured to emit light around the vehicle and detect the object based on reflected light of the light from the object.

8. The information processing apparatus according to claim 1, wherein
the first detection unit is a detection unit of a first classification, and the second detection unit is a detection unit having a functional configuration different from a functional configuration of the first classification.

9. The information processing apparatus according to claim 1, wherein
the determination unit determines that the object has started to move in response to determining that a state of the object satisfies at least two conditions of a condition a, a condition b, and a condition c related to a speed or a position based on a detection result of the first detection unit and determining that the state of the object satisfies at least two conditions of the condition a, the condition b, and the condition c related to the speed or the position based on a detection result of the second detection unit,
the condition a is that a current speed of the object is equal to or higher than a first threshold,
the condition b is that a current speed of the object is higher than a speed of the object a predetermined time before a current time by a second threshold or greater, and
the condition c is that a current position of the object is away from a position of the object a predetermined time before by a third threshold or greater.

10. An information processing method, comprising:
acquiring a first detection result of a first detection unit that detects an object around a vehicle and a second detection result of a second detection unit of which at least a part of a detection range overlaps a detection range of the first detection unit and that detects the object around the vehicle;
determining that the object starts to move in a case in which the vehicle and the object are in a halted state in response to determining that the first detection result indicates that the object starts to move from the halted state and the second detection result indicates that the object starts to move from the halted state; and
controlling a behavior of the vehicle based on a result of the determining,
wherein
the determining comprises initiating a process of determining whether the object starts to move in response to determining that the vehicle is in the halted state or substantially in the halted state at a predetermined speed or slower, and the object is identified based on a detection result detected by the first detection unit at different timings and the object is identified based on a detection result detected by the second detection unit at the different timings before the process is started, otherwise not initiating the process, and
the determining that the object starts to move comprises determining that the object starts to move in response to determining that a state of the object satisfies two or more conditions based on a detection result of the first detection unit and determining that the state of the object satisfies the two or more conditions based on a detection result of the second detection unit.

11. A computer readable non-transitory storage medium storing a program that, in response to execution, causes a computer to perform operations, comprising:
acquiring a detection result of a first detection unit that detects an object around a vehicle and a detection result of a second detection unit having a detection range that at least partially overlaps a detection range of the first detection unit and that detects the object around the vehicle;
determining that the object starts to move in a case in which the vehicle and the object are in a halted state in response to a determination that the detection result of the first detection unit indicates that the object starts to move from the halted state and the detection result of the second detection unit indicates that the object starts to move from the halted state; and
controlling a behavior of the vehicle based on a result of the determining,
wherein
the determining comprises initiating a process of determining whether the object starts to move in response to determining that the vehicle is in the halted state or substantially in the halted state at a predetermined speed or slower, and the object is identified based on a detection result detected by the first detection unit at different timings and the object is identified based on a detection result detected by the second detection unit at the different timings before the process is started, otherwise not initiating the process, and
the determining that the object starts to move comprises determining that the object starts to move in response to determining that a state of the object satisfies two or more conditions based on a detection result of the first detection unit and determining that the state of the object satisfies the two or more conditions based on a detection result of the second detection unit.

\* \* \* \* \*